United States Patent
Gray et al.

(10) Patent No.: US 11,945,977 B2
(45) Date of Patent: Apr. 2, 2024

(54) STYRENE-BASED MATERIALS FOR HOT MELT ADHESIVES

(71) Applicant: BOSTIK, INC., Wauwatosa, WI (US)

(72) Inventors: Steven D. Gray, Mequon, WI (US); Darius K. Deak, Haverhill, MA (US); Brian R. Minix, Wauwatosa, WI (US); Edward P. Tomlinson, Brookfield, WI (US)

(73) Assignee: Bostik, Inc., Wauwatosa, WI (US)

( * ) Notice: Subject to any disclaimer, the term of this patent is extended or adjusted under 35 U.S.C. 154(b) by 951 days.

(21) Appl. No.: 16/486,880

(22) PCT Filed: Feb. 20, 2018

(86) PCT No.: PCT/US2018/018826
§ 371 (c)(1),
(2) Date: Aug. 19, 2019

(87) PCT Pub. No.: WO2018/152531
PCT Pub. Date: Aug. 23, 2018

(65) Prior Publication Data
US 2020/0010743 A1 Jan. 9, 2020

Related U.S. Application Data

(60) Provisional application No. 62/461,052, filed on Feb. 20, 2017.

(51) Int. Cl.
| | |
|---|---|
| *C09J 153/02* | (2006.01) |
| *C08K 3/34* | (2006.01) |
| *C08K 3/36* | (2006.01) |
| *C08K 5/00* | (2006.01) |
| *C08L 25/06* | (2006.01) |
| *C09J 11/06* | (2006.01) |
| *C09J 125/06* | (2006.01) |

(52) U.S. Cl.
CPC ............. *C09J 153/02* (2013.01); *C08L 25/06* (2013.01); *C09J 11/06* (2013.01); *C08K 3/346* (2013.01); *C08K 3/36* (2013.01); *C08K 5/0083* (2013.01); *C08L 2666/06* (2013.01); *C09J 125/06* (2013.01)

(58) Field of Classification Search
CPC .................................................. C09J 2301/304
See application file for complete search history.

(56) References Cited

U.S. PATENT DOCUMENTS

| | | | |
|---|---|---|---|
| 3,957,699 A * | 5/1976 | Solomon ................. | C08F 26/02 526/923 |
| 4,170,583 A * | 10/1979 | Itoh ........................... | C08F 8/44 524/599 |
| 4,486,524 A * | 12/1984 | Fujisaki ............ | G03G 9/08711 430/109.3 |
| 4,820,368 A | 4/1989 | Markevka et al. | |
| 6,063,981 A * | 5/2000 | Wehner ............. | A61F 13/51462 604/385.01 |
| 6,162,859 A | 12/2000 | Lu et al. | |
| 6,391,960 B1 | 5/2002 | Sambasivam et al. | |
| 6,486,229 B1 | 11/2002 | Hu et al. | |
| 7,138,447 B2 | 11/2006 | Saito | |
| 7,267,855 B2 | 9/2007 | Handlin, Jr. et al. | |
| 7,799,863 B2 | 9/2010 | He et al. | |
| 7,847,022 B2 | 12/2010 | Wright et al. | |
| 10,604,682 B2 | 3/2020 | Isobe et al. | |
| 2003/0220460 A1 | 11/2003 | Merfeld | |
| 2016/0032159 A1* | 2/2016 | Fujimoto ................. | C09J 11/06 523/435 |

FOREIGN PATENT DOCUMENTS

| | | |
|---|---|---|
| JP | 2681783 B2 | 9/1898 |
| JP | S63273606 A | 11/1988 |
| JP | 01016811 A | 1/1989 |
| JP | 01095175 A | 4/1989 |
| JP | 2681783 B2 | 9/1989 |
| JP | H01315409 A | 12/1989 |
| JP | A51989095175 A | 12/1995 |
| JP | 2011016859 A2 | 1/2011 |
| JP | 2014080533 A2 | 5/2014 |
| WO | 2015090818 A1 | 6/2015 |

OTHER PUBLICATIONS

Allcock et al., Contemporary Polymer Chemistry, p. 60-65 (1981).*
J.C. Bevington, T.N. Huckerby, "Studies of end-groups in polystyrene using 1H NMR", European Polymer Journal, vol. 42, pp. 1433-1436, (2006).
V. Abetz, G. Muller, R. Stadler, S. Schlick, "The glass transition of mixtures of polystyrene with alkyl-terminated oligostyrene—experimental evidence for microphase separation in a polymer blend", Macromol. Chem. Phys., vol. 196, pp. 3845-3857, (1995).
Lanhe, Zhang et al., "Dramatic Tunability of the Glass Transition Temperature and Fragility of Low Molecular Weight Polystyrene by Initiator Fragments Located at Chain Ends", ACS Publications, Macromolecules, 2016, vol. 49, p. 2387-2398.

* cited by examiner

*Primary Examiner* — Jeffrey C Mullis
(74) *Attorney, Agent, or Firm* — Christopher R. Lewis

(57) ABSTRACT

A hot melt adhesive comprises at least one polymer selected from the group consisting of polystyrene, polybutene, polyisobutene, linear low density polyethylene, polypropylene random copolymer, polypropylene, olefin block copolymer, polyolefins, styrene block copolymers, and ethyl vinyl acetate polymers; a tackifying resin; and at least one precisely end-capped polystyrene (PECPS). The use of the styrene-based oligomers and polymers with the precisely controlled end-groups in hot melt adhesive formulations to improve compatibility with polymers and block copolymers frequently used in such adhesives.

11 Claims, No Drawings

STYRENE-BASED MATERIALS FOR HOT MELT ADHESIVES

CROSS-REFERENCE TO RELATED APPLICATIONS

This application is a U.S. national stage application under 35 U.S.C. § 371 of PCT/US2018/018826 filed Feb. 20, 2018, which claims the benefit under 35 U.S.C. § 119 of U.S. patent application No. 62/461,052, filed Feb. 20, 2017.

TECHNICAL FIELD

Embodiments herein are directed to styrene-based oligomers, polymers, and copolymers with end groups selected to tailor their physical properties and make them well-suited for components in hot melt adhesive (HMA) formulations. Specifically, the end groups of the new styrene-based oligomers, polymers, and copolymers impart elevated thermal properties and/or improved compatibility and/or improved phase selectivity with other components typically employed in hot melt adhesive formulations.

BACKGROUND OF THE INVENTION

Hot melt adhesives typically exist as a solid mass at ambient temperature and can be converted to a flowable liquid by the application of heat. These adhesives are particularly useful in manufacturing a variety of disposable goods where bonding of various substrates is often necessary. Specific applications include disposable diapers, hospital pads, feminine sanitary napkins, pantyshields, surgical drapes and adult incontinent briefs, collectively known as disposable nonwoven hygienic products. Other diversified applications have involved paper products, packaging materials, automotive headliners, appliances, tapes and labels. In most of these applications, the hot melt adhesive is heated to its molten state and then applied to a substrate, often named as the primary substrate. A second substrate, often named as the secondary substrate, is then brought into contact with the first. The adhesive solidifies on cooling to form a strong bond. A major advantage of hot melt adhesives is the typical absence of a liquid carrier, as would be the case of water or solvent based adhesives, thereby eliminating the costly process associated with solvent removal.

Hot melt adhesives are used to bond a wide variety of substrates together in a range of industrial processes. Some of these end uses include sealing cartons and corrugated boxes, labels for a wide variety of applications, and assembling disposable diapers. For some applications the molten hot melt cools to a fairly hard, flexible, solid material with little to no surface tack shortly after adhesive application. One example would be for a carton sealing application where the product should "set up" or solidify quickly to hold the carton flaps in place seconds after the hot melt application. For other applications, the hot melt should have appreciable surface tack after it cools, for example when used as a pressure sensitive tape or label where the adhesive must bond to another substrate when applied at room temperature.

For some other applications such as diaper construction, the adhesive is applied to the substrate in a molten state and is required to rapidly build both internal (cohesive) and adhesive strength upon cooling so that it will hold the article together even though there are forces acting on article that could disrupt the bond to the substrate (adhesive failure or transfer) or rupture the adhesive layer (cohesive failure). One common end use for hot melts is to bond the elastic strands in a diaper in place. The adhesive should be able to resist the contractive force of the elastic strands, since the elastic strands are elongated before they are bonded into the diaper. One other challenge is to ensure that the adhesive does not bleed-though the substrates it is in contact with. Nonwoven fabrics are frequently used in the production of disposable articles and care must be used so that the adhesive does not over-penetrate or bleed-through the nonwoven. If this occurs, it can build on idlers, rollers or compression sections of the diaper line. Many of the adhesives used to make disposable articles are pressure sensitive in nature since this tends to give the hot melt a wider process window. So a balance must be achieved between a relatively low viscosity for ease of application, fast development of internal strength to hold the substrates together immediately after being applied and resistance to over-penetrate or bleed-through even if the adhesive is soft and/or pressure sensitive.

Typically hot melt adhesives can be based on polymers such as polyolefins (e.g. ethylene or propylene based polymers), functionalized polyolefins (ethylene or propylene copolymers with oxygen containing monomers), ethyl vinyl acetate polymers, styrenic block copolymers containing at least one rubbery phase, like styrene-isoprene-styrene (SIS), or styrene-butadiene-styrene (SBS) polymers. Styrenic block copolymers are commonly used for diaper construction applications where nonwoven fabrics are frequently used. They tend to be very resistant to bleed-through on these materials. It is thought this is in part related to the rate at which the styrene end-blocks reform after application to develop stiffness and internal strength, which happens very quickly as the hot melt cools.

Certain hot melt adhesives include a triblock polymer that includes two end-blocks and a midblock. The hot melt adhesive may further include an end-block reinforcing material to increase the cohesive strength of the adhesive. As used herein, the "end-block" of the polymer refers to polymeric blocks which are substantially aromatic. "End-block resins" also referred to as "Pure Monomer Resins" or "PMR", as will be discussed in detail below, are substantially aromatic and generally more compatible with the end-blocks of the polymer. The "midblock" of the polymer refers to polymeric blocks which are typically more elastic in nature and do not contain aromatic materials (and are therefore aliphatic). Tackifiers are often referred to as "midblock resins" and are generally viewed as more compatible with the midblock of the polymer. Current end-block reinforcing materials as well as many common tackifying agents employed to control the balance of tackiness and stiffness (or cohesive strength) exhibit poor long-term stability in adhesive formulations.

There is a need in the art for end-block resins that exhibit selective compatibility with the end-block and improved thermal-mechanical stability for the HMA. There is likewise need in the art for midblock resins that exhibit compatibility with the midblock and improved thermal-mechanical stability for the HMA.

Previous work in the literature (Macromolecules, 2016, 48, 2387) has shown that styrene-based oligomers and polymers can display a large range of thermal properties as a function of molecular weight based on the end-groups of the styrene-based oligomers and polymers. These differences are especially pronounced for shorter styrene-based oligomers. While low MW oligomers are used in HMA formulations today, these oligomers do not have the precisely controlled end-groups of the compounds below. There is no previous work on the use of styrene-based oligomers and polymers with the below precisely controlled endgroups with HMA formulations to improve compatibility with polymers and block copolymers frequently used in the HMA.

SUMMARY OF THE INVENTION

Hot melt adhesives are organic materials typically comprising a polymer, a tackifying resin, optionally an end-block resin, optionally a plasticizer, and optionally an anti-oxidant package. Embodiments herein are directed to styrene-based oligomers, polymers, and copolymers with end-groups that make them well-suited as components in HMA compositions. For ease, the styrene-based oligomers, polymers, and copolymers with tailored end-groups will hereinafter be referred to as "precisely end-capped polystyrenes (PECPS)." PECPS is intended to encompass polystyrenes which may be classified as oligomers or polymers.

The PECPS may partially or completely replace or be used in conjunction with conventional tackifying resins and PMRs. Certain embodiments herein are directed to low molecular weight PECPS as glassy components for use in HMA compositions. Polymers in a HMA composition may have at least one portion including aromatic groups. Embodiments herein include PECPS that are compatible with the at least one portion of the polymer that includes aromatic groups.

In other embodiments, PECPS may also serve to replace existing tackifying agents currently used in HMA compositions. Such PECPS may improve compatibility with aliphatic portions of polymers, provide long-term stability (aged performance) and increase rate of property development (increase in cohesive and adhesive strength when applied in a molten state) for HMA compositions.

A series of embodiments of the invention are discussed below:

Embodiment 1. A hot melt adhesive composition comprising:
  a) about 2% to about 98%, preferably about 10% to about 80%, by weight of at least one polymer selected from the group consisting of polystyrene, polybutene, polyisobutene, linear low density polyethylene, polypropylene random copolymer, polypropylene, olefin block copolymer, polyolefins, styrene block copolymers, and ethyl vinyl acetate polymers;
  b) 0% to about 80% by weight of a tackifying resin; and
  c) about 2% to about 98%, preferably about 2% to about 80%, by weight of at least one precisely end-capped polystyrene (PECPS) of a formula selected from the group consisting of:

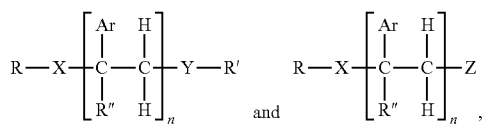

wherein Ar is an aromatic group; R" is selected from the group consisting of H and CH$_3$; X is selected from the group consisting of CH$_2$, CO$_2$ (ester), NHCO, CONH, OCO$_2$, O, and S; Y is selected from the group consisting of CO$_2$ (ester), NHCO, CONH, OCO$_2$, O, and S; R is selected from the group consisting of substituted alkyl, unsubstituted alkyl, cycloalkyl, and aryl; R' is selected from the group consisting of substituted alkyl, unsubstituted alkyl, cycloalkyl, and aryl; Z is selected from the group consisting of H, F, Cl, Br, I. OH. CO$_2$H, and NH$_2$; and n is from 2 to 502.

Embodiment 2. The hot melt adhesive composition of embodiment 1, further comprising a plasticizer.

Embodiment 3. The hot melt adhesive composition of embodiment 2, wherein the hot melt adhesive composition comprising from about 0% to about 50% by weight of the plasticizer.

comprising about 2% to about 98%, preferably about 2% to about 80%, by weight of the precisely end-capped polystyrenes of the above formula I.

Embodiment 4. The hot melt adhesive composition of any of the preceding embodiments, comprising at least about 2%, about 3% about 4%, about 5%, about 6%, about 7%, about 8%, about 9% or about 10% by weight of the at least one PECPS.

Embodiment 5. The hot melt adhesive composition of any of the preceding embodiments, comprising at most about 70%, about 65%, about 60%, about 55%, about 50%, about 45%, about 40%, about 35%. About 30%, about 25%, about 20%, about 19%, about 18%, about 16%, about 15%, about 14%, about 13%, about 12%, about 11%, about 10%, about 9%, about 8%, about 7%, about 6%, about 5%, about 4%, about 3%, or about 2% by weight of the at least one PECPS.

Embodiment 6. The hot melt adhesive composition of any of the preceding embodiments, wherein the at least one polymer includes a portion comprising aromatic groups, and wherein at least a first portion of PECPS is compatible with the portion comprising aromatic groups of the at least one polymer.

Embodiment 7. The hot melt adhesive composition of any of embodiments 1-5, wherein the at least one polymer includes a portion comprising aromatic groups, and wherein at least a first portion of the at least one PECPS is compatible with the portion comprising aromatic groups of the at least one polymer, wherein compatibility between the portion comprising aromatic groups of the at least one polymer and the first portion of PECPS is defined by blends of the first portion of PECPS and the at least one polymer at a range of ratios (1:49 to 49:1, preferably 1:4 to 4:1 PECPS:polymer) exhibiting glass transition temperatures that are each within 25° C., within 20° C., within 15° C., or within 10° C. or less of the Tg predicted by the Fox equation given below:

$$\frac{1}{Tg_{mixture}} = \frac{\omega_{PECPS}}{Tg_{PECPS}} + \frac{\omega_{polymer\ or\ polymer\ segment}}{Tg_{polymer\ or\ polymer\ segment}}$$

wherein Tg refers to the glass transition temperature in Kelvin for the PECPS and polymer or polymer segment and ω refers to the mass ratio of the PECPS and polymer or polymer segment of block copolymer where the mass ratio values, ω, are calculated using the sum of mass of the PECPS and polymer or, in the case of block copolymers, the amount of polymer segment present.

Embodiment 8. The hot melt adhesive composition of any of embodiments 1-5, wherein the at least one polymer comprises an end-block, and wherein at least a first portion of the PECPS is compatible with the end-block of the at least one polymer.

Embodiment 9. The hot melt adhesive composition of any of embodiments 1-5, wherein the at least one polymer comprises an end-block, and wherein at least a first portion of the at least one PECPS is compatible with the end-block of the at least one polymer, wherein compatibility between the end-block of the at least one polymer and the first portion of PECPS is defined by blends of the first portion of PECPS and the at least one polymer at a range of ratios (1:49 to 49:1, preferably 1:4 to 4:1 PECPS: polymer) exhibiting glass transition temperatures that are each within 25° C. of the Tg predicted by the Fox equation given below:

$$\frac{1}{Tg_{mixture}} = \frac{\omega_{PECPS}}{Tg_{PECPS}} + \frac{\omega_{polymer\ or\ polymer\ segment}}{Tg_{polymer\ or\ polymer\ segment}}$$

wherein Tg refers to the glass transition temperature in Kelvin for the PECPS and polymer or polymer segment and w refers to the mass ratio of the PECPS and polymer or polymer segment of block copolymer where the mass ratio values, ω, are calculated using the sum of mass of the PECPS and polymer or, in the case of block copolymers, the amount of polymer segment present.

Embodiment 10. The hot melt adhesive composition of any of the preceding embodiments, wherein the at least one polymer comprises an end-block, and wherein the end-group modified polystyrene oligomer is compatible with the end-block of the at least one polymer.

Embodiment 11. The hot melt adhesive composition of any of the preceding embodiments, wherein each aromatic group, Ar, is independently selected from the group consisting of styrene, alpha-methyl styrene, vinyltoluene, 4-tert-butylstyrene, 2-vinylnaphthalene, and indene and the like.

Embodiment 12. The hot melt adhesive composition of any of the preceding embodiments, wherein the Ar groups are selected from the group consisting of styrene, alphamethylstyrene, 4-tert-butylsytrene, and indene.

Embodiment 13. The hot melt adhesive composition of any of the preceding embodiments, wherein at least 70%, at least 80%, at least 90%, at least 95%, or at least 98% of the Ar groups in a molecule of PECPS are the same.

Embodiment 14. The hot melt adhesive composition of any of the preceding embodiments, wherein substantially all or all of the Ar groups in a molecule of PECPS are the same.

Embodiment 15. The hot melt adhesive composition of any of the preceding embodiments, wherein X of the first portion of the PECPS is $CO_2$ (ester) and wherein R of the first portion of PECPS is selected from the group consisting of

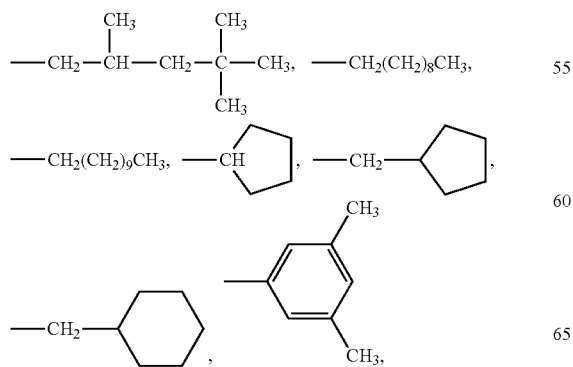

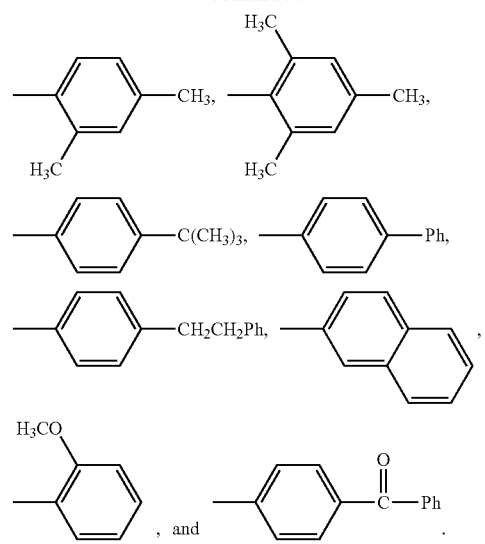

Embodiment 16. The hot melt adhesive composition of any of embodiments 1-14, Y of the first portion of PECPS is $CO_2$ (ester) and wherein R' of the first portion of the PECPS is selected from the group consisting of

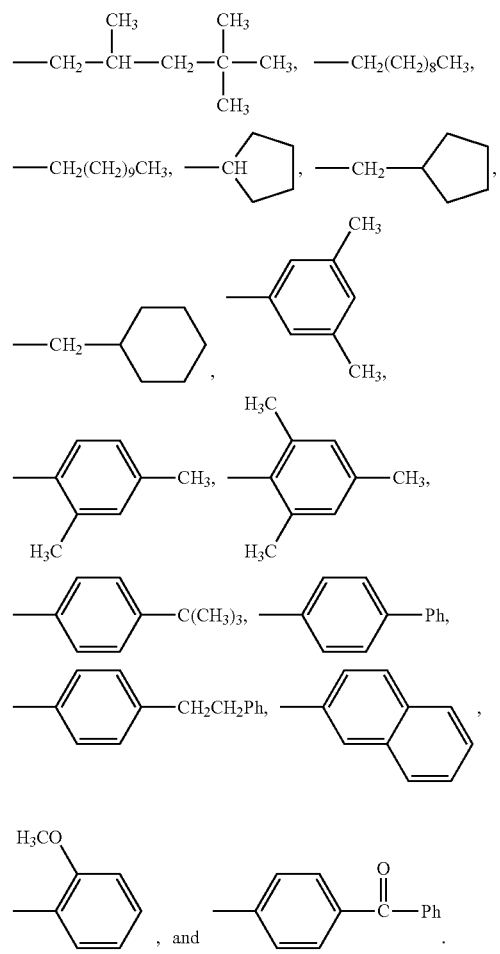

Embodiment 17. The hot melt adhesive composition of any of embodiments 1-14, wherein R and R' of the first portion of the PECPS are selected from the group consisting of:

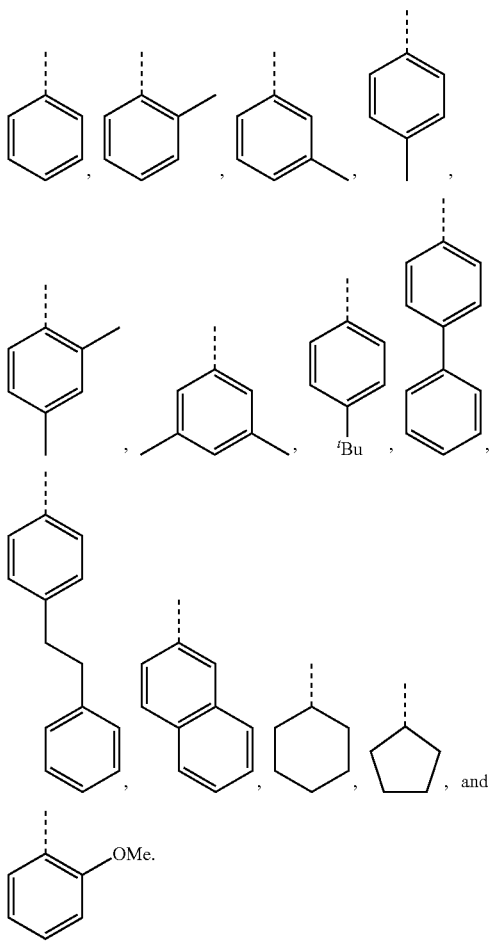

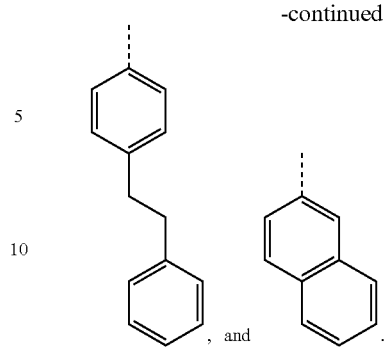

, and .

Embodiment 19. The hot melt adhesive composition of any of embodiments 1-14, wherein R and R' of the first portion of the PECPS are selected from the group consisting of benzene, toluene, xylene, t-butylbenzene, biphenyl, bibenzyl, naphthalene, cyclohexane, cyclopentane, and anisole.

Embodiment 20. The hot melt adhesive composition of any of the preceding embodiments, wherein the at least one polymer includes a portion comprising aliphatic groups, and wherein PECPS is compatible with the portion comprising aliphatic groups of at least one polymer.

Embodiment 21. The hot melt adhesive composition of any of embodiments 1-19, wherein the at least one polymer includes a portion comprising aliphatic groups, and wherein at least a second portion of the at least one PECPS is compatible with the portion comprising aliphatic groups, wherein compatibility between the portion comprising aliphatic groups of the at least one polymer and the second portion of PECPS is defined by blends of the second portion of PECPS and the at least one polymer at a range of ratios (1:49 to 49:1, preferably 1:4 to 4:1 PECPS:polymer) exhibiting glass transition temperatures that are each within 25° C., within 20° C., within 15° C., or within 10° C. or less of the Tg predicted by the Fox equation given below:

$$\frac{1}{Tg_{mixture}} = \frac{\omega_{PECPS}}{Tg_{PECPS}} + \frac{\omega_{polymer\ or\ polymer\ segment}}{Tg_{polymer\ or\ polymer\ segment}}$$

wherein Tg refers to the glass transition temperature in Kelvin for the PECPS and polymer or polymer segment and ω refers to the mass ratio of the PECPS and polymer or polymer segment of block copolymer where the mass ratio values, ω, are calculated using the sum of mass of the PECPS and polymer or, in the case of block copolymers, the amount of polymer segment present.

Embodiment 22. The hot melt adhesive composition of any of embodiments 1-19, wherein the at least one polymer comprises a mid-block, and wherein at least a second portion of the at least one PECPS is compatible with the mid-block of the at least one polymer.

Embodiment 23. The hot melt adhesive composition of any of embodiments 1-19, wherein the at least one polymer comprises a mid-block, and wherein the PECPS is compatible with the mid-block of the at least one polymer, wherein compatibility between the mid-block of the at least one polymer and the second portion of PECPS is defined by blends of the second portion of PECPS and the at least one polymer at a range of ratios (1:49 to 49:1, preferably 1:4 to 4:1 PECPS:polymer) exhibiting glass Embodiment 18. The hot melt adhesive composition of any of embodiments 1-14, wherein R and R' of the first portion of the PECPS are selected from the group consisting of:

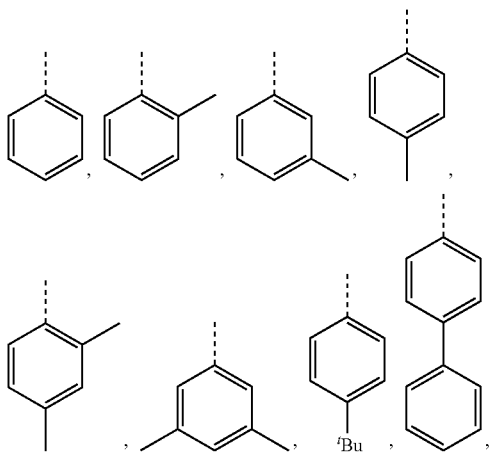

transition temperatures that are each within 25° C., within 20° C., within 15° C., or within 10° C. or less of the Tg predicted by the Fox equation given below:

$$\frac{1}{Tg_{mixture}} = \frac{\omega_{PECPS}}{Tg_{PECPS}} + \frac{\omega_{polymer\ or\ polymer\ segment}}{Tg_{polymer\ or\ polymer\ segment}}$$

wherein Tg refers to the glass transition temperature in Kelvin for the PECPS and polymer or polymer segment and w refers to the mass ratio of the PECPS and polymer or polymer segment of block copolymer where the mass ratio values, ω, are calculated using the sum of mass of the PECPS and polymer or, in the case of block copolymers, the amount of polymer segment present.

Embodiment 24. The hot melt adhesive composition of any of embodiments 22-25, wherein R and R' of the second portion of the at least one PECPS are selected from the group consisting of benzene, toluene, xylene, t-butylbenzene, biphenyl, bibenzyl, naphthalene, cyclohexane, cyclopentane, and anisole.

Embodiment 25. The hot melt adhesive composition of any of embodiments 22-25, wherein R and R' of the second portion of the at least one PECPS are selected from the group consisting of alkyl hydrocarbon chains of at least C6 and cyclo-aliphatic hydrocarbons.

Embodiment 26. The hot melt adhesive composition of any of embodiments 22-25, wherein at least one of R and R' of the second portion of the at least one PECPS are selected from the group consisting of alkyl hydrocarbon chains of C6-C30.

Embodiment 27. The hot melt adhesive composition of any of the preceding embodiments, wherein the polymer includes at least one polymer selected from the group consisting of ethylene based polymers, propylene based polymers, ethylene copolymers with oxygen containing monomer, propylene copolymers with oxygen containing monomer, ethyl vinyl acetate polymers, and styrenic block copolymers containing at least one rubbery phase.

Embodiment 28. The hot melt adhesive composition of embodiment 27, wherein the polymer includes at least one ethylene based polymer.

Embodiment 29. The hot melt adhesive composition of embodiment 27, wherein the polymer includes at least one propylene based polymer.

Embodiment 30. The hot melt adhesive composition of embodiment 27, wherein the polymer includes at least one ethylene copolymer with oxygen containing monomer.

Embodiment 31. The hot melt adhesive composition of embodiment 27, wherein the polymer includes at least one propylene copolymer with oxygen containing monomer.

Embodiment 32. The hot melt adhesive composition of embodiment 27, wherein the polymer includes at least one ethyl vinyl acetate polymer.

Embodiment 33. The hot melt adhesive composition of embodiment 27, wherein the polymer includes at least one styrenic block copolymer containing at least one rubbery phase.

Embodiment 34. The hot melt adhesive composition of embodiment 33, wherein the polymer includes at least one styrene-isoprene-styrene polymer.

Embodiment 35. The hot melt adhesive composition of embodiment 33, wherein the polymer includes at least one styrene-butadiene-styrene polymer.

Embodiment 36. The hot melt adhesive composition of any of the preceding embodiments, wherein the polymer includes at least one functionalized polyolefin.

Embodiment 37. The hot melt adhesive composition of any of the preceding embodiments, wherein the at least one functionalized polyolefin is maleic anhydride modified polyolefin.

Embodiment 38. The hot melt adhesive composition of any of the preceding embodiments, wherein the polymer comprises at least 50% by weight of polyolefin.

Embodiment 39. The hot melt adhesive composition of any of the preceding embodiments comprising at least about 15%, about 20%, about 25%, about 30%, about 35%, about 40%, about 45%, about 50%, about 55%, about 60%, about 65%, about 70%, or about 75% by weight of the at least one polymer.

Embodiment 40. The hot melt adhesive composition of any of the preceding embodiments comprising at most about 75%, about 70%, about 65%, about 60%, about 55%, about 50%, about 45%, about 40%, about 35%, about 30%, about 35%, about 30%, about 25%, or about 20% by weight of the at least one polymer.

Embodiment 41. The hot melt adhesive composition of any of embodiments 1 or 4-40, further comprising a plasticizer, wherein the plasticizer is selected from the group consisting of waxes and mineral oils.

Embodiment 42. The hot melt adhesive composition of any of embodiments 2-3, wherein the plasticizer is selected from the group consisting of waxes and mineral oils.

Embodiment 43. The hot melt adhesive composition of any of embodiments 41-42, wherein the plasticizer includes at least one plasticizer selected from the group consisting of mineral oil, olefin oligomers, low molecular weight polymers, vegetable oils, animal oils, and derivatives thereof.

Embodiment 44. The hot melt adhesive composition of any of embodiments 41-43, wherein less than 30% or less than 20% of carbon atoms in the plasticizer are aromatic carbon atoms.

Embodiment 45. The hot melt adhesive composition of any of embodiments 41-44 comprising at least about 10%, about 15%, about 20%, about 25%, about 30%, about 35%, about 40%, or about 45% by weight of the plasticizer.

Embodiment 46. The hot melt adhesive composition of embodiments 41-45 comprising at most about 45%, about 40%, about 35%, about 30%, about 35%, about 30%, about 25%, about 20%, about 15%, about 10%, or about 5% by weight of the plasticizer.

Embodiment 47. The hot melt adhesive composition of embodiments 1, 4-40 comprising no plasticizer.

Embodiment 48. The hot melt adhesive composition of any of the preceding embodiments further comprising at least one additive selected from the group consisting of inert colorants, fillers, fluorescent agents, UV absorbers, surfactants, and additional types of polymers.

Embodiment 49. The hot melt adhesive composition of any of the preceding embodiments comprising an inert colorant.

Embodiment 50. The hot melt adhesive composition of any of the preceding embodiments comprising titanium dioxide.

Embodiment 51. The hot melt adhesive composition of any of the preceding embodiments comprising at least one filler selected from the group consisting of talc, calcium carbonate, clay silica, mica, wollastonite, feldspar, aluminum silicate, alumina, hydrated alumina, glass microspheres, ceramic microspheres, thermoplastic microspheres, baryte and wood flour.

Embodiment 52. The hot melt adhesive composition of any of the preceding embodiments comprising at least one fluorescent agent.

Embodiment 53. The hot melt adhesive composition of any of the preceding embodiments comprising at least one UV absorber.

Embodiment 54. The hot melt adhesive composition of any of the preceding embodiments comprising at least one surfactant.

Embodiment 55. The hot melt adhesive composition of any of the preceding embodiments comprising at least one additional type of polymer.

Embodiment 56. The hot melt adhesive composition of any of the preceding embodiments further comprising at least one nucleating agent.

Embodiment 57. The hot melt adhesive composition of any of the preceding embodiments further comprising at least one clarifying agent.

Embodiment 58. The hot melt adhesive composition of any of the preceding embodiments, wherein the viscosity of the composition is equal to or less than about 30,000 centipoise (cP) at 163° C. (325° F.).

Embodiment 59. The hot melt adhesive composition of any of the preceding embodiments, wherein the viscosity of the composition is equal to or less than about 25,000 centipoise (cP) at 163° C. (325° F.).

Embodiment 60. The hot melt adhesive composition of any of the preceding embodiments, wherein the viscosity of the composition is equal to or less than about 20,000 centipoise (cP) at 163° C. (325° F.).

Embodiment 61. The hot melt adhesive composition of any of the preceding embodiments, wherein the viscosity of the composition is equal to or less than about 15,000 centipoise (cP) at 163° C. (325° F.).

Embodiment 62. The hot melt adhesive composition of any of the preceding embodiments, wherein the viscosity of the composition is equal to or less than about 10,000 centipoise (cP) at 163° C. (325° F.).

Embodiment 63. The hot melt adhesive composition of any of the preceding embodiments, comprising from about 2% to about 20% by weight of the first portion of the at least one PECPS.

Embodiment 64. The hot melt adhesive composition of any of the preceding embodiments, comprising from about 2% to about 5% by weight of the first portion of the at least one PECPS.

Embodiment 65. The hot melt adhesive composition of the preceding embodiments, comprising about 10% to about 50% by weight of the at least one polymer, about 20% to about 80% by weight of the tackifying resin, and about 2% to about 20% by weight of the at least one PECPS.

Embodiment 66. The hot melt adhesive composition of any of embodiments 1-64, comprising from about 20% to about 78% by weight of the second portion of the at least one PECPS.

Embodiment 67. The hot melt adhesive composition of embodiments 1-62, comprising about 20% to about 80% by weight of the at least one polymer and about 20% to about 80% by weight of the at least one PECPS.

Embodiment 68. The hot melt adhesive composition of embodiment 67, comprising no tackifying resin.

Embodiment 69. The hot melt adhesive composition of any of embodiments 1-67, comprising the tackifying resin and the tackifying resin includes at least one tackifying resin selected from the group consisting of aliphatic and cycloaliphatic petroleum hydrocarbon resins having Ring and Ball softening points of from 10° C. to 150° C., as determined by ASTM method E28-58T; hydrogenated aliphatic and cycloaliphatic petroleum hydrocarbon resins; aromatic petroleum hydrocarbon resins and the hydrogenated derivatives thereof; aliphatic/aromatic petroleum derived hydrocarbon resins and the hydrogenated derivatives thereof; aromatic modified cycloaliphatic resins and the hydrogenated derivatives thereof; polyterpene resins having a softening point of from about 10° C. to about 140° C.; hydrogenated polyterpene resins; copolymers and terpolymers of natural terpenes; gum rosin; wood rosin; tall-oil rosin; distilled rosin; hydrogenated rosin; dimerized rosin; polymerized rosin; glycerol ester of pale wood rosin; glycerol ester of hydrogenated rosin; glycerol ester of polymerized rosin; pentaerythritol ester of pale wood rosin; pentaerythritol ester of hydrogenated rosin; pentaerythritol ester of tall-oil rosin; phenolic modified pentaerythritol ester of rosin; and phenolic-modified terpene resins.

Embodiment 70. The hot melt adhesive composition of any of embodiments 1-19, wherein the at least one polymer does not comprise a block copolymer, and wherein the Tg predicted by the Fox equation given below:

$$\frac{1}{Tg\text{(mixture)}} = \frac{\omega\ PECPS}{Tg\ (PECPS)} + \frac{\omega\ \text{Polymer}}{Tg\ (\text{Polymer})}$$

wherein ω PECPS and polymer and Tg PECPS and polymer refer to the mass ratio of the PECPS or polymer and glass transition temperature in Kelvin of the PECPS or the mid-block of the polymer.

Embodiment 71. The hot melt adhesive of embodiment 27, wherein the polymer includes at least hydrogenated SBS or SIS polymer.

Embodiment 72. The hot melt adhesive of embodiment 71, wherein the hydrogenated SBS or SIS polymer is styrene-ethylene/butylene-styrene (SEBS) or styrene-ethylene/propylene-styrene (SEPS).

DETAILED DESCRIPTION OF THE INVENTION

Described herein are styrene-based oligomers, polymers, and copolymers with end groups well-suited as components in HMA compositions. For example, embodiments of the these precisely end-capped polystyrenes (PECPS) and styrene oligomers may be carefully selected to tailor their physical properties. For example, embodiments of the chain end groups may be designed to improve the compatibility and phase selectivity of PECPS with other components typically employed in HMA compositions.

Current end-block reinforcing grades as well as non-hydrogenated hydrocarbon tackifiers have poor long-term stability with non-aromatic, alternatives to styrene-based polymers such as polyolefins that could be used in adhesive formulations to lower costs and improve thermal-mechanical stability.

Hot melt adhesives are typically organic materials typically comprising a polymer, a plasticizer, a tackifying resin and an antioxidant package. A hot melt adhesive may further include an end-block reinforcing material, which may increase the cohesive strength of the adhesive. Other ingredients, such as wax, filler, a functionalized polymer, a colorant and UV absorber, may also be used to modify the adhesive properties or to provide special attributes. Each of these components and their content in HMA compositions that embody the invention are discussed in detail below.

Embodiments of the invention include HMA comprising a PECPS selected from the formulae consisting of:

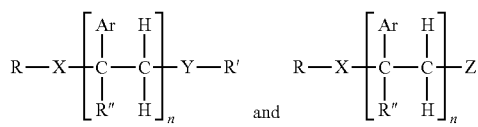

wherein Ar is an aromatic group; R" is selected from the group consisting of H and $CH_3$; X is selected from the group consisting of $CO_2$ (ester), NHCO, CONH, $OCO_2$, O, and S; Y is selected from the group consisting of $CO_2$ (ester), NHCO, CONH, $OCO_2$, O, and S; R is selected from the group consisting of substituted alkyl, unsubstituted alkyl, cycloalkyl, and aryl; R' is selected from the group consisting of substituted alkyl, unsubstituted alkyl, cycloalkyl, and aryl; Z is selected from the group consisting of H, F, Cl, Br, I. OH. $CO_2H$, and $NH_2$; and n is from 2 to 500.

The Ar groups are independently selected. The Ar group within the bracket in the formulae above for PECPS may include aromatic groups that are not the same. In some embodiments, at least 70% of the Ar groups in a molecule of a PECPS are the same. In some embodiments, at least 80% of the Ar groups in a molecule of a PECPS are the same. In some embodiments, at least 90% of the Ar groups are the same. In some embodiments, at least 95% of the Ar groups in a PECPS molecule are the same. In some embodiments, at least 98% of the Ar groups in a PECPS molecule are the same. In some embodiments, substantially all of the Ar groups in a PECPS molecule are the same. In some embodiments, all of the Ar groups in a PECPS molecule are the same.

The R" groups are independently selected. The R" group within the bracket in the formulae above for PECPS may include groups that are not the same, wherein some of the R" groups are H and some of the R" groups are $CH_3$. In some embodiments, at least 70% of the R" groups in a molecule of a PECPS are the same. In some embodiments, at least 80% of the R" groups in a molecule of a PECPS are the same. In some embodiments, at least 90% of the R" groups are the same. In some embodiments, at least 95% of the R" groups in a molecule are the same. In some embodiments, at least 98% of the R" groups are the same. In some embodiments, substantially all of the R" groups in a PECPS molecule are the same. In some embodiments, all of the R" groups in a PECPS molecule are the same.

In some embodiments, the PECPS has the following structure:

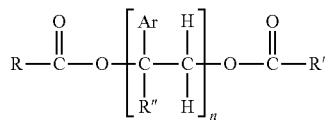

wherein n is from 2 to 500 and Ar, R, and R' are as defined above.

In embodiments of the invention, HMAs that include end-block resins comprising the PECPS discussed above, the Ar groups are selected from the group consisting of styrene, alpha-methyl styrene, vinyltoluene, 4-tertbutylstyrene, 2-vinylnaphthalene, and indene. In some embodiments of the invention, HMAs that include end-block resins comprising the PECPS discussed above, the Ar groups are selected from the group consisting of styrene, alphamethylstyrene, 4-tert-butylsytrene; and indene.

In embodiments of the invention, HMAs that include end-block resins comprising the PECPS discussed above, R and R' are independently selected from the group consisting of:

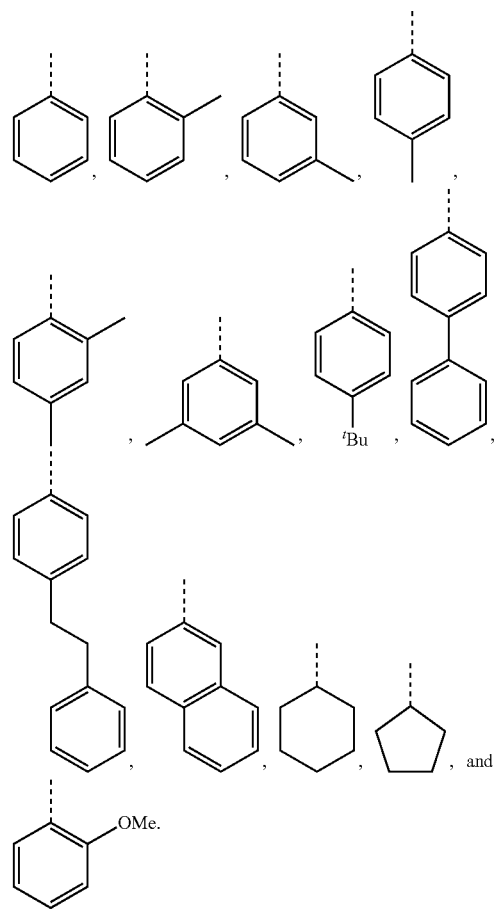

In embodiments of the invention, HMAs comprise from about 2% to about 98% by weight of the PECPS discussed above. In preferred embodiments, the HMAs comprise from about 2% to about 60% by weight of the PECPS discussed above.

In embodiments of the invention, HMAs comprise at least about 2% by weight of the PECPS discussed above. In some embodiments, HMAs comprise at least about 1%, at least about 2%, at least about 3%, at least about 4%, at least about 5%, at least about 6%, at least about 7%, at least about 8%, at least about 9%, or at least about 10% by weight of the PECPS discussed above.

In some embodiments, HMAs comprise at most about 80%, at most about 70%, at most about 60%, at most about 50%, at most about 40%, at most about 30%, at most about 20%, at most about 15%, at most about 12%, at most about 11%, at most about 10%, at most about 9%, at most about 8%, at most about 7%, at most about 6%, at most about 5%, at most about 4%, at most about 3%, or at most about 2% by weight of the PECPS discussed above.

Polymers in HMA may include at least one aliphatic portion ("midblock") and at least one aromatic portion ("end-block"). The at least one aromatic portion of a polymer molecule may associate with the at least one aromatic portion of another polymer molecule. While the midblock and end-block of a polymer are chemically connected through the backbone of the polymer chain, the midblock and end-block may, without being bound by theory, form microphases in the HMA, with aromatic rich regions and aliphatic rich regions.

The at least one aromatic portion of polymers may stiffen the HMA. The at least one aromatic portion of a polymer molecule (as discussed above, the end-block) may contribute to the cohesive strength of the HMA due to selective association with the at least one aromatic portion of other polymer molecules. This allows the modulus of the adhesive to be modified in a manner independent of other features. For example, the modulus may be increased without negatively impacting the viscosity as would be the case using high polymer loadings.

End-block resins, compatible with the aromatic portions of the polymers, may be used to increase the cohesive strength of the HMA. The end-block resins, without being bound by theory, selectively associate with end-blocks of the polymer, increasing the volume of the styrene domains and, in turn, the overall modulus (or stiffness) of the material.

There is a need in the art for end-block resins that exhibit greater compatibility with polymer end-blocks in HMAs. End-block resins exhibit superior compatibility of polymer end-blocks by more selectively associating with the end-blocks than midblocks of the polymer. Further, superior end-block resins exhibit long-term stability in the association between end-blocks and end-block resins, limiting separation between end-blocks and end-block resins over time.

The end-block resin may increase the glass transition temperature (Tg) of the aromatic rich microphase regions. An end-block resin that exhibits superior compatibility with the polymer end-blocks may increase the Tg of the aromatic rich microphase regions with limited impact on the Tg of the aliphactic rich microphase regions.

Embodiments of the invention include HMA with novel end-block resins. The end-block resin may comprise PECPS of the following Formulae Set I:

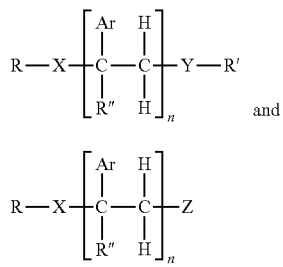

Formula Ia and

Formula Ib wherein Ar is an aromatic group; R" is selected from the group consisting of H and CH$_3$; X is selected from the group consisting of CO$_2$ (ester), NHCO, CONH, OCO$_2$, O, and S; Y is selected from the group consisting of CO$_2$ (ester), NHCO, CONH, OCO$_2$, O, and S; R is selected from the group consisting of substituted alkyl, unsubstituted alkyl, cycloalkyl, and aryl; R' is selected from the group consisting of substituted alkyl, unsubstituted alkyl, cycloalkyl, and aryl; Z is selected from the group consisting of H, F, Cl, Br, I. OH. CO$_2$H, and NH$_2$; and n is from 2 to 502. For clarity, the PECPS of Formulas Ia and Ib will hereinafter be referred to as "PECPS of Formulae Set I."

The Ar groups are independently selected. The Ar group within the brackets of Formulae Set I may include aromatic groups that are not the same. In some embodiments, at least 70% of the Ar groups in a PECPS molecule of Formulae Set I are the same. In some embodiments, at least 80% of the Ar groups in a PECPS molecule of Formulae Set I are the same. In some embodiments, at least 90% of the Ar groups in a PECPS molecule of Formulae Set I are the same. In some embodiments, at least 95% of the Ar groups in a PECPS molecule of Formulae Set I are the same. In some embodiments, at least 98% of the Ar groups in a PECPS molecule of Formulae Set I are the same. In some embodiments, substantially all of the Ar groups in a PECPS molecule of Formulae Set I are the same. In some embodiments, all of the Ar groups in a PECPS molecule of Formulae Set I are the same.

The R" groups are independently selected. The R" group within the bracket in Formulae Set I may include groups that are not the same, wherein some of the R" groups are H and some of the R" groups are CH$_3$. In some embodiments, at least 70% of the R" groups in a PECPS molecule of Formulae Set I are the same. In some embodiments, at least 80% of the R" groups in a PECPS molecule of Formulae Set I are the same. In some embodiments, at least 90% of the R" groups in a PECPS molecule of Formulae Set I are the same. In some embodiments, at least 95% of the R" groups in a PECPS molecule of Formulae Set I are the same. In some embodiments, at least 98% of the R" groups in a PECPS molecule of Formulae Set I are the same. In some embodiments, substantially all of the R" groups in a PECPS molecule of Formulae Set I are the same. In some embodiments, all of the R" groups in a PECPS molecule of Formulae Set I are the same.

In some embodiments, the PECPS of Formulae Set I has the following structure:

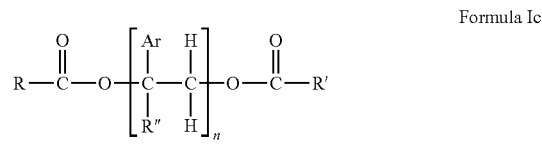

Formula Ic wherein n is from 2 to 500 and Ar, R, and R' are as defined above for Formulas Ia and Ib.

In embodiments of the invention, HMAs that include end-block resins comprising the PECPS of Formulae Set I discussed above, the Ar groups are selected from the group consisting of styrene, alpha-methyl styrene, vinyltoluene, 4-tertbutylstyrene, 2-vinylnaphthalene, and indene. In some embodiments of the invention, HMAs that include end-block resins comprising the PECPS of Formulae Set I discussed above, the Ar groups are selected from the group consisting of styrene, alphamethylstyrene, 4-tert-butyl-sytrene; and indene.

In embodiments of the invention, HMAs that include end-block resins comprising the PECPS of Formulae Set I discussed above, R and R' are independently selected from the group consisting of:

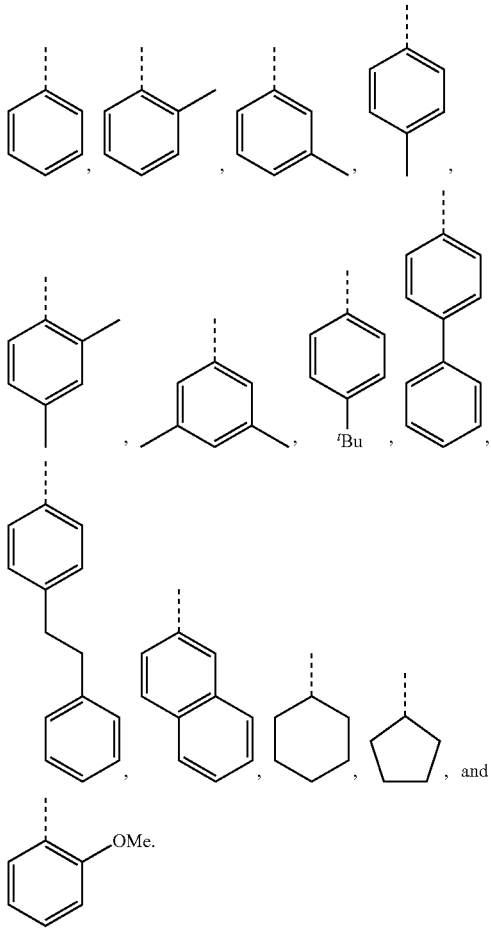

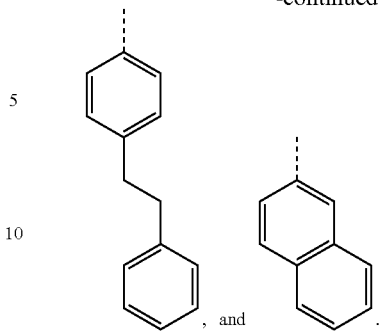

, and .

In preferred embodiments of the invention, HMAs that include end-block resins comprising the PECPS of Formulae Set I discussed above, R and R' are independently selected from the group consisting of:

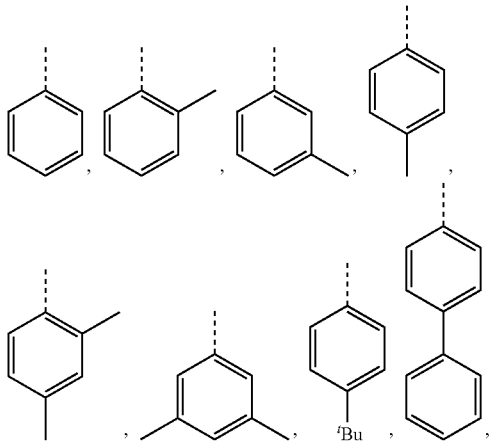

In embodiments of the invention, HMAs comprise from about 2% to about 80% by weight of the PECPS of Formulae Set I discussed above. In preferred embodiments, the HMAs comprise from about 2% to about 60% by weight of the PECPS of Formulae Set I discussed above. In some embodiments, the HMAs comprise from about 2% to about 5% by weight of the PECPS of Formulae Set I discussed above.

In embodiments of the invention, HMAs comprise at least about 2% by weight of the PECPS of Formulae Set I discussed above. In some embodiments, HMAs comprise at least about 1%, at least about 2%, at least about 3%, at least about 4%, at least about 5%, at least about 6%, at least about 7%, at least about 8%, at least about 9%, or at least about 10% by weight of the PECPS of Formulae Set I discussed above.

In some embodiments, HMAs comprise at most about 80%, at most about 70%, at most about 60%, at most about 50%, at most about 40%, at most about 30%, at most about 20%, at most about 15%, at most about 12%, at most about 11%, at most about 10%, at most about 9%, at most about 8%, at most about 7%, at most about 6%, at most about 5%, at most about 4%, at most about 3%, or at most about 2% by weight of the PECPS of Formulae Set I discussed above.

The at least one aliphatic portion of polymers may form a rubbery phase that softens the HMA. Without being bound by theory, the softness of the HMA helps the HMA to conform to substrates bonded by the HMA. This ability to conform leads to increased surface interactions of the adhesive and substrates and, in turn, improved chemical and mechanical bonding.

Midblock resins, compatible with the aliphatic portions of the polymers, may be used to improve the thermal mechanical properties of the HMA. Midblock resins can also be referred to as tackifiers. The midblock resins, without being bound by theory, selectively associate with midblocks of the polymer and increase the Tg of the aliphatic rich microphase. The addition of stiffer, glassy materials to the midblocks adjusts the glass transition temperature of the rubbery phase as required for the end-use application as well as helps the adhesive withstand mechanical stresses.

There is a need in the art for midblock resins that exhibit greater or more selective compatibility with polymer midblocks of styrene-block copolymers in HMAs. In triblock SBS and SIS systems, midblock resins exhibit superior compatibility of polymer midblocks by more selectively associating with the poly(butadiene) and poly(isoprene) midblocks than styrene end-blocks of the polymer. Further, superior midblock resins exhibit long-term stability in the association between midblocks and midblock resins, limiting phase separation between the polymer and the midblock resins over time.

The midblock resin may increase the glass transition temperature (Tg) of the aliphatic rich microphase regions. If the Tg of the polymer midblocks are too low, the microphase will flow too readily at cooler temperatures, deform, and lead to bond disruption. A midblock resin that exhibits superior compatibility with the polymer midblocks may increase the Tg of the aliphactic rich microphase regions with limited impact on the Tg of the aromatic rich microphase regions. Such increases in the midblock glass transition temperature help the adhesive resist flow and mechanical deformation at relatively low temperatures that can lead to bond failures.

Embodiments of the invention include HMA with novel midblock resins (also known as tackifiers). The midblock resin may comprise PECPS of the following Formulae Set II:

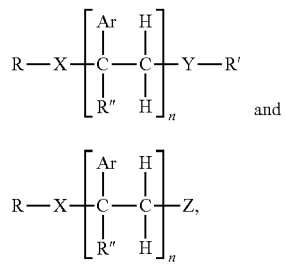

Formula Ia

Formula Ib and wherein Ar is an aromatic group; R" is selected from the group consisting of H and CH$_3$; X is selected from the group consisting of CO$_2$ (ester), NHCO, CONH, OCO$_2$, O, and S; Y is selected from the group consisting of CO$_2$ (ester), NHCO, CONH, OCO$_2$, O, and S; R is selected from the group consisting of substituted alkyl, unsubstituted alkyl, cycloalkyl, and aryl; R' is selected from the group consisting of substituted alkyl, unsubstituted alkyl, cycloalkyl, and aryl; Z is selected from the group consisting of H, F, Cl, Br, I. OH. CO$_2$H, and NH$_2$; and n is from 2 to 502. For clarity, the PECPS of Formulas IIa and IIb will hereinafter be referred to as "PECPS of Formulae Set II."The Ar groups are independently selected. The Ar group within the brackets of Formulae Set II may include aromatic groups that are not the same. In some embodiments, at least 70% of the Ar groups in a PECPS molecule of Formulae Set II are the same. In some embodiments, at least 80% of the Ar groups in a PECPS molecule of Formulae Set II are the same. In some embodiments, at least 90% of the Ar groups in a PECPS molecule of Formulae Set II are the same. In some embodiments, at least 95% of the Ar groups in a PECPS molecule of Formulae Set II are the same. In some embodiments, at least 98% of the Ar groups in a PECPS molecule of Formulae Set II are the same. In some embodiments, substantially all of the Ar groups in a PECPS molecule of Formulae Set II are the same. In some embodiments, all of the Ar groups in a PECPS molecule of Formulae Set II are the same.

The R" groups are independently selected. The R" group within the bracket in Formulae Set II may include groups that are not the same, wherein some of the R" groups are H and some of the R" groups are CH$_3$. In some embodiments, at least 70% of the R" groups in a PECPS molecule of Formulae Set II are the same. In some embodiments, at least 80% of the R" groups in a PECPS molecule of Formulae Set II are the same. In some embodiments, at least 90% of the R" groups in a PECPS molecule of Formulae Set II are the same. In some embodiments, at least 95% of the R" groups in a PECPS molecule of Formulae Set II are the same. In some embodiments, at least 98% of the R" groups in a PECPS molecule of Formulae Set II are the same. In some embodiments, substantially all of the R" groups in a PECPS molecule of Formulae Set II are the same. In some embodiments, all of the R" groups in a PECPS molecule of Formulae Set II are the same.

In some embodiments, the PECPS of Formulae Set II has the following structure:

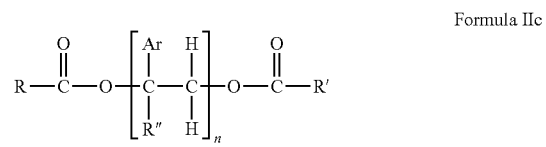

Formula IIc wherein n is from 2 to 500 and Ar, R, and R' are as defined above for Formulas IIa and IIb.

In embodiments of the invention, HMAs that include midblock resins comprising the PECPS of Formulae Set II discussed above, the Ar groups are selected from the group consisting of styrene, alpha-methyl styrene, vinyltoluene, 4-tertbutylstyrene, 2-vinylnaphthalene, and indene. In some embodiments of the invention, HMAs that include midblock resins comprising the PECPS of Formulae Set II discussed above, the Ar groups are selected from the group consisting of styrene, alphamethylstyrene, 4-tert-butylsytrene; and indene.

In some embodiments of the invention, HMAs that include midblock resins comprising the PECPS of Formulae Set II discussed above, R and R' may be substituted or unsubstituted long-chain hydrocarbons of at least C4. In some embodiments, R and R' may be substituted or unsubstituted long-chain hydrocarbons of at least C6, at least C7, at least C8, at least C9, at least C10, at least C11, at least C12, at least C13, at least C14, at least C15, at least C16, at least C17, at least C18, at least C19, or at least C20.

In some embodiments of the invention, HMAs that include midblock resins comprising the PECPS of Formulae Set II discussed above, R and R' may be substituted or unsubstituted long-chain hydrocarbons of at most C40. In some embodiments, R and R' may be substituted or unsubstituted long-chain hydrocarbons of at most C35, at most C30, at most C28, at most C26, at most C25, at most C24, at most C22, at most C20, at most C18, at most C16, at most C15, at most C14, at most C13, or at most C12.

In some embodiments of the invention, HMAs that include midblock resins comprising the PECPS of Formulae Set II discussed above, R and R' may be cyclo-aliphatic hydrocarbons.

In some embodiments, R is a substituted or unsubstituted long-chain hydrocarbon and described above and R' is a substituted or unsubstituted cyclo-aliphatic hydrocarbon. In other embodiments, R is a substituted or unsubstituted cyclo-aliphatic hydrocarbon as described above and R' is a substituted or unsubstituted long-chain hydrocarbon as described above. In some embodiments wherein X is —CO$_2$, R may be selected from the group consisting of the entries in Table A below. In some embodiments wherein Y is —CO$_2$, R' may be selected from the group consisting of the entries in Table A below.

TABLE A

| Class | R = |
|---|---|
| Branched alkyl | —CH₂—CH(CH₃)—CH₂—C(CH₃)₂—CH₃ |
| Long-Chain Alkyl | —CH₂(CH₂)₈CH₃, —CH₂(CH₂)₉CH₃ |
| Cycloalkyl | —CH(cyclopentyl); —CH₂-(cyclopentyl); —CH₂-(cyclohexyl) |
| Alkyl-Substituted Aryls | —(3,5-dimethylphenyl); —(3,4-dimethylphenyl); —(3,4,5-trimethylphenyl); —(4-tert-butylphenyl) |
| Aryl-Substituted Aryls | —(4-phenylphenyl); —(4-(CH₂CH₂Ph)phenyl) |
| Naphthenic | —(naphthyl) |
| Hetero-Substituted Aryls | —(2-methylphenyl); |

TABLE A-continued

| Class | R = |
|---|---|
| | —(4-benzoylphenyl), i.e. —C₆H₄—C(=O)—Ph |

In some embodiments wherein X is —CO₂, R may be selected from the group consisting of the entries in Table B below. In some embodiments wherein Y is —CO₂, R' may be selected from the group consisting of the entries in Table B below.

TABLE B

| Class | R = |
|---|---|
| Branched alkyl | —CH₂—CH(CH₃)—CH₂—C(CH₃)₂—CH₃ |
| Long-Chain Alkyl | —CH₂(CH₂)₈CH₃, —CH₂(CH₂)₉CH₃ |
| Cycloalkyl | —CH(cyclopentyl); —CH₂-(cyclopentyl); —CH₂-(cyclohexyl) |

In embodiments of the invention, HMAs comprise from about 2% to about 80% by weight of the PECPS of Formulae Set II discussed above. In preferred embodiments, the HMAs comprise from about 2% to about 60% by weight of the PECPS of Formulae Set II discussed above. In yet more preferred embodiments, the HMAs comprise from about 20% to about 60% by weight of the PECPS of Formulae Set II discussed above.

In embodiments of the invention, HMAs comprise at least about 2% by weight of the PECPS of Formulae Set II discussed above. In some embodiments, HMAs comprise at least about 2%, at least about 5%, at least about 10%, at least about 15%, at least about 20%, at least about 25%, at least about 30%, at least about 35%, at least about 40%, or at least about 45% by weight of the PECPS of Formulae Set II discussed above.

In some embodiments, HMAs comprise at most about 80%, at most about 70%, at most about 65%, most about 60%, at most about 55%, at most about 50%, at most about 45%, at most about 40%, at most about 35%, at most about 30%, at most about 25%, at most about 20%, at most about 15%, or at most about 10% by weight of the PECPS of Formulae Set II discussed above.

In embodiments of the invention, the HMA comprises compatible tackifying resins or tackifiers, which are those which extend adhesive properties and improve specific adhesion. Conventional "tackifying resins," each of which may be used in embodiments of the invention, include:

(a) aliphatic and cycloaliphatic petroleum hydrocarbon resins having Ring and Ball softening points of from 10° C. to 150° C., as determined by ASTM method E28-58T, the later resins resulting from the polymerization of monomers consisting primarily of aliphatic and/or cycloaliphatic olefins and diolefins; also included are the hydrogenated aliphatic and cycloaliphatic petroleum hydrocarbon resins; examples of such commercially available resins based on a C5 olefin fraction of this type are Piccotac 95 tackifying resin sold by Eastman Chemicals and Escorez 1310LC sold by ExxonMobil Chemical Company and examples of hydrogenated cycloaliphatic petroleum hydrocarbon resins based on cyclopentadiene are Escorez 5400 from Exxonmobil and Resinall R1095S from Resinall Corporation;

(b) aromatic petroleum hydrocarbon resins and the hydrogenated derivatives thereof; an example of hydrogenated aromatic hydrocarbon resin is Arkon P-115 from Arakawa Chemicals;

(c) aliphatic/aromatic petroleum derived hydrocarbon resins and the hydrogenated derivatives thereof;

(d) aromatic modified cycloaliphatic resins and the hydrogenated derivatives thereof;

(e) polyterpene resins having a softening point of from about 10° C. to about 140° C., the latter polyterpene resins generally resulting from the polymerization of terpene hydrocarbons, such as the mono-terpene known as pinene, in the presence of Friedel-Crafts catalysts at moderately low temperatures; also included are the hydrogenated polyterpene resins;

(f) copolymers and terpolymers of natural terpenes, e.g. styrene/terpene, α-ethyl styrene/terpene and vinyl toluene/terpene;

(g) natural and modified rosin such as, for example, gum rosin, wood rosin, tall-oil rosin, distilled rosin, hydrogenated rosin, dimerized rosin and polymerized rosin;

(h) glycerol and pentaerythritol esters of natural and modified rosin, such as, for example, the glycerol ester of pale wood rosin, the glycerol ester of hydrogenated rosin, the glycerol ester of polymerized rosin, the pentaerythritol ester of pale wood rosin, the pentaerythritol ester of hydrogenated rosin, the pentaerythritol ester of tall-oil rosin, and the phenolic modified pentaerythritol ester of rosin; and (i) phenolic-modified terpene resins such as, for example, the resin product resulting from the condensation in an acidic medium of a terpene and a phenol.

In embodiments of the invention, the HMA may include multiple tackifying resins.

In embodiments, the HMA comprises about 0% to about 60% by weight of at least one tackifying resin. In some embodiments, the HMA comprises about 10% to about 60% by weight of at least one tackifying resin. In some embodiments, the HMA comprises about 15% to about 60% by weight of at least one tackifying resin. In some embodiments, the HMA comprises about 20% to about 60% by weight of at least one tackifying resin. In additional embodiments of the invention, the HMA comprises about 30% to about 60% by weight of at least one tackifying resin, preferably from about 35% to about 50% by weight of at least one tackifying resin.

In some embodiments, the HMA comprises at least about 0%, about 5%, about 10%, about 15%, about 20%, about 25%, about 30%, about 35%, about 40%, about 45%, about 50%, about 55%, or about 60%, by weight of at least one tackifying resin. In some embodiments, the HMA comprises at most about 80%, about 75%, about 70%, about 65%, about 60%, about 55%, about 50%, about 45%, about 40%, about 35%, about 30%, about 25%, about 20%, about 15%, about 10%, or about 5% by weight of at least one tackifying resin.

In some embodiments, the HMA comprises 0% by weight of at least one tackifying resin. In these embodiments, the PECPS acts like a "Pure Monomer Resin" and replaces the tackifying resin.

Tackifying resins which are useful for the present invention may include polar tackifying resins. Many polar resins appear only partially compatible with polyolefins. More compatible polar resins are preferred.

Preferably, the tackifying resins may be selected from any of the nonpolar types, which are commercially available. Preferred resins are aliphatic petroleum hydrocarbon resins and most preferred are nonpolar products such as hydrogenated dicyclopentadiene (HDCPD) or aromatically modified derivatives thereof with softening points above 70° C. Examples of such resins are Escorez 5400 and Escorez 5600 sold by ExxonMobil Chemical company.

In an embodiment of the invention, at least some of the tackifying resin in the HMA is replaced by a PECPS of Formulae Set II above. In some embodiments, the HMA is essentially free of tackifier in favor of PECPS of Formulae Set II. In some embodiments, the tackifier of the HMA composition is completely replaced by PECPS of Formulae Set II.

To replace a tackifying resin, the PECPS of Formulae Set II are compatible with a portion comprising aliphatic groups of the at least one polymer.

In some embodiments, the HMA comprises a PECPS of Formulae Set I as described above and a PECPS of Formulae Set II as described above. In embodiments, the content of a PECPS of Formulae Set I above and the content of a PECPS of Formulae Set II above are as described in their respective sections above. The PECPS of Formulae Set I is compatible with an aromatic portion of the at least one polymer. The PECPS of Formulae Set II is compatible with an aliphatic portion of the at least one polymer.

In some embodiments, the PECPS of Formulae Set I is about 3% to about 40% of the total content of PECPS as described above. In some embodiments, the PECPS of Formulae Set I is about 3% to about 25% of the total content of PECPS as described above. In some embodiments, the PECPS of Formulae Set I is about 5% to about 30% of the total content of PECPS as described above. In some embodiments, the PECPS of Formulae Set I is about 10% to about 20% of the total content of PECPS as described above.

In some embodiments, the HMA comprises from about 2% to about 40% by weight of PECPS of Formulae Set I and from about 20% to about 60% by weight of PECPS of Formulae Set II. In some embodiments, the HMA comprises from about 2% to about 30% by weight of PECPS of Formulae Set I and from about 20% to about 60% by weight of PECPS of Formulae Set II. In some embodiments, the HMA comprises from about 2% to about 5% by weight of PECPS of Formulae Set I and from about 20% to about 60% by weight of PECPS of Formulae Set II.

In embodiments of the invention, HMAs comprise at least about 2% by weight of the PECPS of Formulae Set I discussed above. In some embodiments, HMAs comprise at least about 1%, at least about 2%, at least about 3%, at least about 4%, at least about 5%, at least about 6%, at least about 7%, at least about 8%, at least about 9%, or at least about 10% by weight of the PECPS of Formulae Set I discussed above.

In some embodiments, HMAs comprise at most about 80%, at most about 70%, at most about 60%, at most about 50%, at most about 40%, at most about 30%, at most about 20%, at most about 15%, at most about 12%, at most about 11%, at most about 10%, at most about 9%, at most about 8%, at most about 7%, at most about 6%, at most about 5%, at most about 4%, at most about 3%, or at most about 2% by weight of the PECPS of Formulae Set I discussed above.

In embodiments of the invention, HMAs comprise at least about 2% by weight of the PECPS of Formulae Set II discussed above. In some embodiments, HMAs comprise at least about 2%, at least about 5%, at least about 10%, at least about 15%, at least about 20%, at least about 25%, at least about 30%, at least about 35%, at least about 40%, or at least about 45% by weight of the PECPS of Formulae Set II discussed above.

In some embodiments, HMAs comprise at most about 80%, at most about 70%, at most about 65%, most about 60%, at most about 55%, at most about 50%, at most about 45%, at most about 40%, at most about 35%, at most about 30%, at most about 25%, at most about 20%, at most about 15%, or at most about 10% by weight of the PECPS of Formulae Set II discussed above.

In embodiments of the invention, the polymer of the HMA may be any polymer known in the art for use in an adhesive. In some embodiments, the polymer is at least one polymer selected from the group consisting of polystyrene, polybutene, polyisobutene, linear low density polyethylene, polypropylene random copolymer, polypropylene, olefin block copolymer, polyolefins, styrene block copolymers, and ethyl vinyl acetate polymers. In some embodiments, the at least one polymer is selected from the group consisting of polystyrene, polybutene, polyisobutene, linear low density polyethylene, polypropylene random copolymer, polypropylene, and olefin block copolymer. In some embodiments, the polymer is at least one polymer selected from the group consisting of polyolefins, styrene block copolymers, and ethyl vinyl acetate polymers. In some embodiments, the polymer is a polyolefin. Examples of polyolefins include ethylene or propylene based polymers. In some embodiments, the polyolefin is a functionalized polyolefin. Examples of functionalized polyolefins include ethylene or propylene copolymers with oxygen containing monomers. In some embodiments, the polymer is a styrene block copolymer. The styrene block copolymers contain at least one rubbery phase (also referred to as an aliphatic phase). In some embodiments, the styrene block copolymer is styrene-isoprene-styrene (SIS) polymers. In some embodiments, the styrene block copolymer is styrene-butadiene-styrene (SBS). In some embodiments, the polymer is an ethyl vinyl acetate polymer.

In some embodiments, the polymer component of the HMA comprises a polyolefin, although this does not exclude small amounts of non-polyolefin constituents, such as less than 49% by weight, more preferably less than 25% by weight, more preferably less than 10% by weight, and most preferably less than 5% by weight. Preferably, the polymer component comprises at least 50% by weight of polyolefin. The polymer component may comprise polyolefins or a blend of polyolefins or may consist essentially of a polyolefin or a blend of polyolefins or may consist of a polyolefin or a blend of polyolefins. Some exemplary polyolefin-based adhesives suitable for use in connection with the present invention include those disclosed in US 2015/0024649 A1, incorporated herein by reference. The polymer may be a polypropylene impact copolymer available from Lyondell-Basell. Heterophasic polymers may be defined as multiple phase polymers, containing both continuous and discontinuous polymer phases. The continuous phase can also be referred to as the matrix phase and the discontinuous phase known as the rubber or elastomeric phase.

In some embodiments, the HMA comprises about 10% to about 80% by weight of at least one polymer selected from the group consisting of polystyrene, polybutene, polyisobutene, linear low density polyethylene, polypropylene random copolymer, polypropylene, and olefin block copolymer. In some embodiments, the HMA comprises about 20% to about 80% by weight of at least one polymer selected from the group consisting of polystyrene, polybutene, polyisobutene, linear low density polyethylene, polypropylene random copolymer, polypropylene, and olefin block copolymer. In some embodiments, the HMA comprises about 10% to about 50% by weight of at least one polymer selected from the group consisting of polystyrene, polybutene, polyisobutene, linear low density polyethylene, polypropylene random copolymer, polypropylene, and olefin block copolymer. In some embodiments, the HMA comprises about 10% to about 40% by weight of at least one polymer selected from the group consisting of polystyrene, polybutene, polyisobutene, linear low density polyethylene, polypropylene random copolymer, polypropylene, and olefin block copolymer. In some embodiments, the HMA comprises about 30% to about 40% by weight of at least one polymer selected from the group consisting of polystyrene, polybutene, polyisobutene, linear low density polyethylene, polypropylene random copolymer, polypropylene, and olefin block copolymer. In additional embodiments, the HMA comprises about 20% to about 50% by weight of at least one polymer selected from the group consisting of polystyrene, polybutene, polyisobutene, linear low density polyethylene, polypropylene random copolymer, polypropylene, and olefin block copolymer.

In some embodiments, the HMA comprises at least about 5%, about 10%, about 15%, about 20%, about 25%, about 30%, or about 35% by weight of at least one polymer selected from the group consisting of polystyrene, polybutene, polyisobutene, linear low density polyethylene, polypropylene random copolymer, polypropylene, and olefin block copolymer. In some embodiments, the HMA comprises at most about 80%, about 60%, about 55%, about 50%, about 45%, about 40%, or about 35% by weight of at least one polymer selected from the group consisting of polystyrene, polybutene, polyisobutene, linear low density polyethylene, polypropylene random copolymer, polypropylene, and olefin block copolymer.

In some embodiments, the HMA comprises about 10% to about 80% by weight of at least one polymer selected from the group consisting of polystyrene, polybutene, polyisobutene, linear low density polyethylene, polypropylene random copolymer, polypropylene, olefin block copolymer, polyolefins, styrene block copolymers, and ethyl vinyl acetate polymers. In some embodiments, the HMA comprises about 20% to about 80% by weight of at least one polymer selected from the group consisting of polystyrene, polybutene, polyisobutene, linear low density polyethylene, polypropylene random copolymer, polypropylene, olefin block copolymer, polyolefins, styrene block copolymers, and ethyl vinyl acetate polymers. In some embodiments, the HMA comprises about 10% to about 50% by weight of at least one polymer selected from the group consisting of polystyrene, polybutene, polyisobutene, linear low density polyethylene, polypropylene random copolymer, polypropylene, olefin block copolymer, polyolefins, styrene block copolymers, and ethyl vinyl acetate polymers. In some embodiments, the HMA comprises about 10% to about 40% by weight of at least one polymer selected from the group consisting of polystyrene, polybutene, polyisobutene, linear low density polyethylene, polypropylene random copolymer, polypropylene, olefin block copolymer, polyolefins, styrene block copolymers, and ethyl vinyl acetate polymers. In some embodiments, the HMA comprises about 30% to about 40% by weight of at least one polymer selected from the group consisting of polystyrene, polybutene, polyisobutene, linear low density polyethylene, polypropylene random copolymer, polypropylene, olefin block copolymer, polyolefins, styrene block copolymers, and ethyl vinyl acetate polymers. In additional embodiments, the HMA comprises about 20% to about 50% by weight of at least one polymer selected from the group consisting of polystyrene, polybutene, polyisobutene, linear low density polyethylene, polypropylene random copolymer, polypropylene, olefin block copolymer, polyolefins, styrene block copolymers, and ethyl vinyl acetate polymers.

In some embodiments, the HMA comprises at least about 5%, about 10%, about 15%, about 20%, about 25%, about 30%, or about 35% by weight of at least one polymer selected from the group consisting of polystyrene, polybutene, polyisobutene, linear low density polyethylene, polypropylene random copolymer, polypropylene, olefin block copolymer, polyolefins, styrene block copolymers, and ethyl vinyl acetate polymers. In some embodiments, the HMA comprises at most about 80%, about 60%, about 55%, about 50%, about 45%, about 40%, or about 35% by weight of at least one polymer selected from the group consisting of polystyrene, polybutene, polyisobutene, linear low density polyethylene, polypropylene random copolymer, polypropylene, olefin block copolymer, polyolefins, styrene block copolymers, and ethyl vinyl acetate polymers.

In some embodiments, the HMA comprises about 10% to about 80% by weight of at least one polymer selected from the group consisting of polystyrenes and polyolefins. In some embodiments, the HMA comprises about 20% to about 80% by weight of at least one polymer selected from the group consisting of polystyrenes and polyolefins. In some embodiments, the HMA comprises about 10% to about 50% by weight of at least one polymer selected from the group consisting of polystyrenes and polyolefins. In some embodiments, the HMA comprises about 10% to about 40% by weight of at least one polymer selected from the group consisting of polystyrenes and polyolefins. In some embodiments, the HMA comprises about 30% to about 40% by weight of at least one polymer selected from the group consisting of polystyrenes and polyolefins. In additional embodiments, the HMA comprises about 20% to about 50% by weight of at least one polymer selected from the group consisting of polystyrenes and polyolefins.

In some embodiments, the HMA comprises at least about 5%, about 10%, about 15%, about 20%, about 25%, about 30%, or about 35% by weight of at least one polymer selected from the group consisting of polystyrenes and polyolefins. In some embodiments, the HMA comprises at most about 80%, about 60%, about 55%, about 50%, about 45%, about 40%, or about 35% by weight of at least one polymer selected from the group consisting of polystyrenes and polyolefins.

Optionally, a plasticizer may be included in the HMA composition. The plasticizer of the HMA may be any plasticizer known in the art for use in an adhesive. A suitable plasticizer may be selected from the group which includes the usual plasticizing oils, such as mineral oil, but also olefin oligomers and low molecular weight polymers, as well as vegetable and animal oils and derivatives thereof. The petroleum derived oils which may be employed are relatively high boiling materials containing only a minor proportion of aromatic hydrocarbons. In this regard, the aromatic hydrocarbons should preferably be less than 30% and more particularly less than 15% of the oil, as measured by the fraction of aromatic carbon atoms. More preferably, the oil may be essentially non-aromatic. The oligomers may be polypropylenes, polybutenes, hydrogenated polyisoprenes, hydrogenated polybutadienes, or the like having average molecular weight between about 350 g/mole and about 10,000 g/mole. Suitable vegetable and animal oils include glycerol esters of the usual fatty acids and polymerization products thereof. Other useful plasticizers can be found in the families of conventional dibenzoate, phosphate, phthalate esters, as well as esters of mono- or polyglycols. Examples of such plasticizers includes, but are not limited to dipropylene glycol dibenzoate, pentaerythritol tetrabenzoate, 2-ethylhexyl diphenyl phosphate, polyethylene glycol 400-di-2-ethylhexoate; butyl benzyl phthalate, dibutyl phthalate and dioctylphthalate. The plasticizers that find usefulness in the present invention can be any number of different plasticizers, but the inventors have discovered that mineral oil and liquid polybutenes having average molecular weight less than 5,000 g/mol are particularly advantageous. As will be appreciated, plasticizers have typically been used to lower the viscosity of the overall adhesive composition without substantially decreasing the adhesive strength and/or the service temperature of the adhesive as well as to extend the open time and to improve flexibility of the adhesive. In some embodiments, the plasticizer is a mineral oil.

In embodiments, the HMA comprises 0% to about 80% by weight of a plasticizer. In some embodiments, the HMA comprises about 1% to about 80% by weight of a plasticizer. In some embodiments, the HMA comprises about 2% to about 70% by weight of a plasticizer. In some embodiments, the HMA comprises about 5% to about 60% by weight of a plasticizer. In some embodiments, the HMA comprises about 5% to about 50% by weight of a plasticizer. In some embodiments, the HMA comprises about 10% to about 40% by weight of a plasticizer. In additional embodiments of the invention, the HMA comprises about 1% to about 35% by weight of a plasticizer, preferably from about 2% to about 20% by weight of a plasticizer. In some embodiments, the HMA comprises at least about 2%, about 5%, about 10%, about 15%, about 20%, about 25%, about 30%, about 35%, about 40%, or about 45% by weight of a plasticizer. In some embodiments, the HMA comprises at most about 80%, about 60%, about 55%, about 50%, about 45%, about 40%, or about 35% by weight of a plasticizer.

Optionally, a functionalized polymer may be included in the HMA composition. In some embodiments, the functionalized polymer is maleic anhydride modified polyolefins.

Optionally, waxes may be included used to reduce the melt viscosity of the HMA composition. Although amounts varying from about 0% to about 20% by weight may be used in the composition of the present invention, the preferred amounts are between about 0% to about 15% by weight. These waxes can also effect the set-up time and the softening point of the adhesive. Among the useful waxes are:
 1. low molecular weight, that is, number average molecular weight (Mn) equal to 500-6000 g/mole, polyethylene having a hardness value, as determined by ASTM method D-1321, of from about 0.1 to 120, having an ASTM softening point of from about 65° C. to 140° C.;

2. petroleum waxes such as paraffin wax having a melting point of from about 50° C. to 80° C. and microcrystalline wax having a melting point of from about 55° C. to 100° C., the latter melting points being determined by ASTM method D127-60;
3. synthetic waxes made by polymerizing carbon monoxide and hydrogen such as Fischer-Tropsch wax; and
4. polyolefin waxes. As used herein, the term "polyolefin wax" refers to those polymeric or long-chain entities comprised of olefinic monomer units. This type of materials are commercially available from Westlake Chemical corporation, 2801 Post Oak Blvd., Houston, TX under the tradename designation "Epolene" and from Honeywell Corporation, 101 Columbia Road, Morristown, NJ under the trade name designation "A-C". The materials which are preferred for use in the composition of the present invention have a Ring and Ball softening point of from about 100° C. to 170° C. As should be understand, each of these wax diluents is solid the room temperature.

Other substances which include hydrogenated animal, fish and vegetable fats and oils such as hydrogenated tallow, lard, soya oil, cottonseed oil, castor oil, menhadin oil, cod liver oil, and the like, and which are solid at the room temperature by virtue of their being hydrogenated, are also useful with respect to functioning as a wax diluent equivalent. These hydrogenated materials are often referred to in the adhesive industry as "animal or vegetable waxes".

Embodiments of the invention may include a stabilizer in an amount of from about 0.1% to about 3% by weight. Preferably from about 0.2% to 1% of a stabilizer is incorporated into the composition. The stabilizers which are useful in the hot melt adhesive compositions of the present invention are incorporated to help protect the polymers noted above, and thereby the total adhesive system, from the effects of thermal and oxidative degradation which normally occurs during the manufacture and application of the adhesive as well as in the ordinary exposure of the final product to the ambient environment. Among the applicable stabilizers are high molecular weight hindered phenols and multifunction phenols, such as sulfur and phosphorous-containing phenols. Hindered phenols are well known to those skilled in the art and may be characterized as phenolic compounds that also contain sterically bulky radicals in close proximity to the phenolic hydroxyl group thereof. In particular, tertiary butyl groups generally are substituted onto the benzene ring in at least one of the ortho positions relative to the phenolic hydroxyl group. The presence of these sterically bulky substituted radicals in the vicinity of the hydroxyl group serves to retard its stretching frequency and correspondingly, its reactivity; this steric hindrance thus providing the phenolic compound with its stabilizing properties. Representative hindered phenols include:

1,3,5-trimethyl-2,4,6-tris(3-5-di-tert-butyl-4-hydroxybenzyl) benzene;
pentaerythirtol tetrakis-3(3,5-di-tert-butly-4-hydroxyphenyl) propionate;
n-octadecyl-3(3,5-di-tert-butyl-4-hydroxyphenyl) propionate;
4,4'-methylenebis(4-methyl-6-tert butylphenol);
2, 6-di-tert-butylphenol;
6-(4-hydroxyphnoxy)-2,4-bis(n-ocytlthio)-1,3,5-triazine;
2,3,6-tris(4-hydroxy-3,5-di-tert-butyl-phenoxy)-1,3,5-triazine;
di-n-octadecyl-3,5-di-tert-butyl-4-hydroxybenzylphosphonate;
2-(n-octylthio)ethyl-3,5-di-tert-butyl-4-hydroxybenzoate; and
sorbitol hexa-3(3,5-di-tet-butyl-4-hydroxy-phenyl) propionate.

The performance of these stabilizers may be further enhanced by utilizing, in conjunction therewith; (1) synergists such as, for example, thiodipropionate esters and phosphites; and (2) chelating agents and metal deactivators as, for example, ethylenediamenetetraacitic acid, slats thereof, and disalicylalpropylenediimine.

It should be understood that other optional additives may be incorporated into the adhesive composition used with the present invention in order to modify particular physical properties. These may include, for example, such materials as inert colorants e.g. titanium dioxide, fillers, fluorescent agents, UV absorbers, surfactants, other types of polymers, etc. Typical fillers include talc, calcium carbonate, clay silica, mica, wollastonite, feldspar, aluminum silicate, alumina, hydrated alumina, glass microspheres, ceramic microspheres, thermoplastic microspheres, baryte and wood flour. Surfactants are particularly important in hygienic disposable nonwoven because they can dramatically reduce the surface tension, for example, of the adhesive applied to diaper core, thereby permitting quicker transport and subsequent absorption of urine by the core. Additional suitable additives include nucleating and/or clarifying agents.

In some embodiments, the viscosity of a hot melt adhesive is equal to or less than about 30,000 centipoise (cP) at 163° C. (325° F.). In other embodiments, the viscosity of a hot melt adhesive is equal to or less than about 20,000 centipoise (cP) at 163° C. (325° F.). In yet other embodiments, the viscosity of a hot melt adhesive is equal to or less than about 10,000 centipoise (cP) at 163° C. (325° F.).

Short-chain styrenic oligomers and polymers are often used as components in styrene-block-copolymer HMA compositions. These glassy materials are referred to in the industry as "Pure Monomer Resins" (PMR) since—unlike other hydrocarbon components designed to provide cohesive strength—they are produced using well-defined monomer streams. Commercial PMR systems are typically generated from polymerization reactions of one or more of the following: styrene, alpha-methyl styrene (AMS), vinyltoluene (VT), 4-tertbutylstyrene, and, 2-vinylnaphthalene, indene, and the like.

As noted above, PMR materials are relatively small molecules generally possessing weight average molecular weights below 20,000 g/mol. Despite their low degree of polymerization, the pendant styrene-based moieties on the chain resist molecular motion and chain folding (crystallization) processes. Thus, these small materials tend to be amorphous in nature and display high glass transition temperatures (30-160° C.).

These features make PMR systems well suited for use in hot melt adhesive systems as they may be added to plasticized polymer mixtures to increase the thermal properties (increase Tg, the glass transition temperature of the polymer mixture, and thereby maintain the adhesive in higher temperature environments) and modulus of the final adhesive to meet thermo-mechanical requirements of the end-use application. The relatively low molecular weight of PMR systems is particularly beneficial as it allows adhesive properties to be adjusted without large increases in the molten viscosity that would compromise molten flow and the ability to apply them evenly to various substrates in end-use applications. Here modulus refers to stiffness of the adhesive. A soft (low modulus) adhesive can exhibit high tackiness and form strong bonds to substrates; nevertheless, these "weak" materials tend to deform readily and fail cohesively with minimal mechanical force. For example, a tacky, low modulus material would not be suitable to glue shut the lid of a cardboard cereal box as the retractive forces of the fold to be held in place would overcome the internal strength of the adhesive resulting in the cohesive bond failure even if the adhesive strongly binds to the cardboard.

Though highly useful in HMA compositions, commercial PMR systems today possess some limitations. PMR materials are often said to be "end-block reinforcing" species which partition selectively into the styrenic phases of SBc-containing HMA systems to improve cohesive strength of the styrene phase. Though some degree of partitioning is likely, selective styrene phase inclusion appears far from universal. Thus, when PMR materials are added to many hot melt formulations, changes to thermal transitions associated with both styrene and butadiene/tackifier phases are often seen suggesting little selectivity (1). In such cases, the PMR appears to be serving little more than lower-cost C5/C9 hydrocarbon (HC) and hydrogenated hydrocarbon (HHC) tackifying agents commonly employed in the industry.

The ability of PMR materials to behave in a manner similar to hydrocarbon tackifying agents in SBc-containing systems does, however, give potential options to adhesive formulators. This option is not expected to be universal, however, as current PMR materials, much like many modified hydrocarbon resins that contain aromatic moieties, display limited compatibility with polyolefins. Thus they are not well-suited for use in polyethylene- and polypropylene-containing adhesives. This is especially critical as systems based on these low-cost, low-odor alternatives may be generated that display equivalent initial adhesive performance as SBc-analogues. However, over time adhesive performance deteriorates with phase separation. The phase separation stems from the limited compatibility of many tackifying agents with polyolefins (another way to say this, is the compatibility is not so strikingly high as to motivate the polyolefin to undergo self-crystallization processes that lead to phase separation and loss of properties). Given their semicrystalline nature, polyolefin-containing adhesives also tend to develop properties only slowly compared to SBc-based systems. The rate of property development can be troublesome in end-use applications. In particular, the continued flow of an adhesive stemming from slow set up can lead over-penetration of permeable and/or low-basis weight substrates. This deep or complete penetration of the substrate can leading to blocking using and, in severe cases, the buildup of adhesive on process equipment.

Embodiments of the endgroup modified polystyrene systems described herein are advantageous due to: 1) the offering of benefits of current styrenic systems in terms of adjusting the modulus, cohesive strength, and thermo-mechanical properties of hot-melt adhesives without dramatically increasing the molten viscosity; 2) the display of enhanced compatibility compared to current materials to allow selective interaction of the PMR with the desired domain in phase-separated SBc adhesives; and 3) the tailoring to have excellent initial- and long-term compatibility with polyolefins as well as impart more rapid vitrification/crystallization when employed as mixtures with these semicrystalline polymers.

Embodiments described herein thus proposed PMR-like technology that exploits endgroup effects to tailor the chemical- and thermo-mechanical properties of these molecules to make them better suited for hot-melt adhesives when compared to the commercial materials of today.

Any methods known in the art by which the endgroups can be generated would be suitable. Representative examples of R and R' of the free radical initiator include: alkyls, branched alkyls, substituted alkyls, cycloaliphatics, and aryl derivatives such as those shown below:

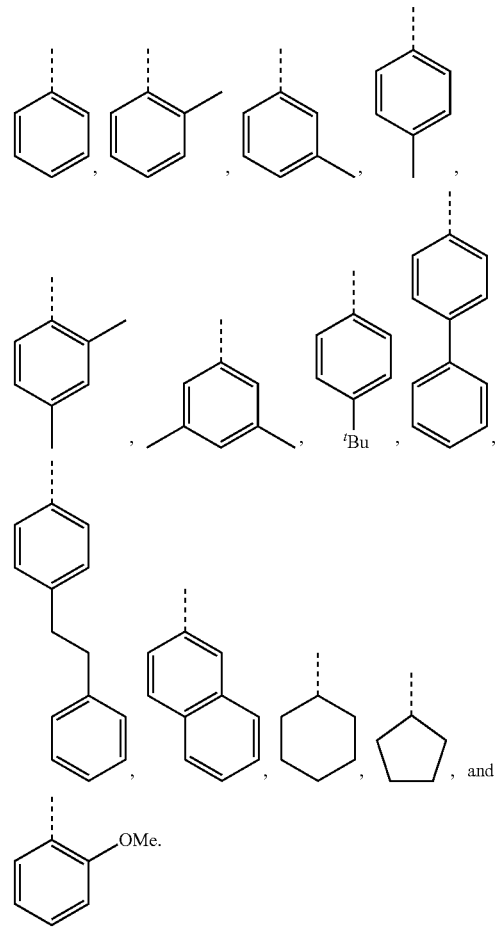

For tuning the thermo-mechanical properties (strength and viscosity at elevated temperatures), the styrenic polymers and copolymers described herein includes material described as highly atactic, predominately atactic, highly isotactic, predominately isotactic, highly syndiotactic, or predominately syndiotactic in terms of racemic or meso orientation of the pendant the aromatic side chain groups. PECPS may be selected in accordance with Formulae Set I and/or Formulae Set II above to tune the thermo-mechanical properties.

The PECPS may be produced by any method known in the art. For example, PECPS may be produced based on the reaction below:

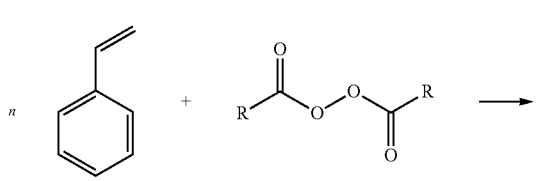

-continued

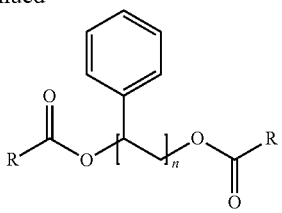

wherein n=5, 10, or 20; and R is selected from the group consisting of the entries in Table C below:

TABLE C

| Class | R = |
|---|---|
| Branched alkyl | —CH$_2$—CH(CH$_3$)—CH$_2$—C(CH$_3$)$_3$ |
| Long-Chain Alkyl | —CH$_2$(CH$_2$)$_8$CH$_3$, —CH$_2$(CH$_2$)$_9$CH$_3$ |
| Cycloalkyl | cyclopentyl; —CH$_2$-cyclopentyl; —CH$_2$-cyclohexyl |
| Alkyl-Substituted Aryls | 3,5-dimethylphenyl; 3,4-dimethylphenyl; 3,4,5-trimethylphenyl; 4-tert-butylphenyl |
| Aryl-Substituted Aryls | 4-phenylphenyl; 4-(2-phenylethyl)phenyl |

TABLE C-continued

| Class | R = |
|---|---|
| Naphthenic | 2-naphthyl |
| Hetero-Substituted Aryls | 2-methoxyphenyl; 4-benzoylphenyl |

Improved compatibility between PECPS and a portion of a polymer is gauged by thermal behavior; namely, that blends of PECPS at a wide range of ratios (1:49 to 49:1, preferably 1:4 to 4:1 PECPS:polymer) display glass transition temperatures that are each within 25° C. of the Tg of the mixture predicted by the Fox equation given below:

$$\frac{1}{Tg_{mixture}} = \frac{\omega_{PECPS}}{Tg_{PECPS}} + \frac{\omega_{polymer\ or\ polymer\ segment}}{Tg_{polymer\ or\ polymer\ segment}}$$

Wherein Tg refers to the glass transition temperature in Kelvin for the PECPS and polymer or polymer segment (in the event that the polymer is a block copolymer) and ω refers to the mass ratio of the PECPS and polymer or polymer segment of block copolymer where the mass ratio values, ω, are calculated using the sum of mass of the PECPS and polymer or, in the case of block copolymers, the amount of polymer segment present.

For clarity of this calculation, provided here is an example. Assume a 100 g blend of 50 wt % PECPS possessing a Tg of 50° C. (323 K) and 50 wt % of a SBS polymer containing 40% polystyrene that displays a Tg of 120° C. (393 K) that is associated with the polystyrene segments. Then, Mass PECPS=100 g mixture×0.5 g PECPS/g mixture=50 g PECPS Mass PS Segments=100 g mixture×0.5 g SBS/g mixture×0.40 g PS segments/g SBS=20 g PS segments Total Mass for Fox Equation=50 g (from PECPS)+ 20 g (PS phase of SBS)=70 g Total Mass ratio PECPS, ω PECPS=50 g (PECPS)/ 70 g (Total)=0.714

Mass Ratio PS Segments, ω PS=20 g (PS segments)/ 70 g (Total)=0.286

$$\frac{1}{Tg(mixture)} = \frac{0.714}{323\ K} + \frac{0.286}{393\ K}$$

Solving this, the Tg predicted from Fox Equation would be 340 K or 67° C.

When a PECPS is described as "compatible" with a microphase above, the actual $T_g$(mixture) is within 25° C. of the $T_g$(mixture) that the Fox equation would predict. Preferably, the actual $T_g$(mixture) is within 20° C. of the $T_g$(mixture) that the Fox equation would predict. More preferably, the actual $T_g$(mixture) is within 15° C. of the $T_g$(mixture) that the Fox equation would predict. Most preferably, the actual $T_g$(mixture) is within 10° C. of the $T_g$(mixture) that the Fox equation would predict.

The compatibility of PECPS of Formulae Set I with an aromatic portion of the at least one polymer is within 25° C. of the $T_g$(mixture) that the Fox equation would predict. Preferably, the actual $T_g$(mixture) of the PECPS of Formulae Set I with the aromatic portion of the at least one polymer is within 20° C. of the $T_g$(mixture) that the Fox equation would predict. More preferably, the actual $T_g$(mixture) of the PECPS of Formulae Set I with the aromatic portion of the at least one polymer is within 15° C. of the $T_g$(mixture) that the Fox equation would predict. Most preferably, the actual $T_g$(mixture) of the PECPS of Formulae Set I with the aromatic portion of the at least one polymer is within 10° C. of the $T_g$(mixture) that the Fox equation would predict.

In some embodiments, the at least one polymer includes a portion comprising aromatic groups, and wherein at least a first portion of the at least one PECPS is compatible with the portion comprising aromatic groups of the at least one polymer, wherein compatibility between the portion comprising aromatic groups of the at least one polymer and the first portion of PECPS is defined by blends of the first portion of PECPS and the at least one polymer at a range of ratios (1:49 to 49:1, preferably 1:4 to 4:1 PECPS:polymer) exhibiting glass transition temperatures that are each within 25° C. of the Tg predicted by the Fox equation given below:

$$\frac{1}{Tg_{mixture}} = \frac{\omega_{PECPS}}{Tg_{PECPS}} + \frac{\omega_{polymer\ or\ polymer\ segment}}{Tg_{polymer\ or\ polymer\ segment}}$$

wherein Tg refers to the glass transition temperature in Kelvin for the PECPS and polymer or polymer segment and w refers to the mass ratio of the PECPS and polymer or polymer segment of block copolymer where the mass ratio values, ω, are calculated using the sum of mass of the PECPS and polymer or, in the case of block copolymers, the amount of polymer segment present. In some embodiments, the at least one polymer comprises an end-block, and wherein at least a first portion of the at least one PECPS is compatible with the end-block of the at least one polymer, wherein compatibility between the end-block of the at least one polymer and the first portion of PECPS is defined by blends of the first portion of PECPS and the at least one polymer at a range of ratios (1:49 to 49:1, preferably 1:4 to 4:1 PECPS:polymer) exhibiting glass transition temperatures that are each within 25° C. of the Tg predicted by the Fox equation given below:

$$\frac{1}{Tg_{mixture}} = \frac{\omega_{PECPS}}{Tg_{PECPS}} + \frac{\omega_{polymer\ or\ polymer\ segment}}{Tg_{polymer\ or\ polymer\ segment}}$$

wherein Tg refers to the glass transition temperature in Kelvin for the PECPS and polymer or polymer segment and w refers to the mass ratio of the PECPS and polymer or polymer segment of block copolymer where the mass ratio values, ω, are calculated using the sum of mass of the PECPS and polymer or, in the case of block copolymers, the amount of polymer segment present. The compatibility of PECPS of Formulae Set II with an aliphatic portion of the at least one polymer is within 25° C. of the $T_g$(mixture) that the Fox equation would predict. Preferably, the actual $T_g$(mixture) of the PECPS of Formulae Set II with the aliphatic portion of the at least one polymer is within 20° C. of the $T_g$(mixture) that the Fox equation would predict. More preferably, the actual $T_g$(mixture) of the PECPS of Formulae Set II with the aliphatic portion of the at least one polymer is within 15° C. of the $T_g$(mixture) that the Fox equation would predict. Most preferably, the actual $T_g$(mixture) of the PECPS of Formulae Set II with the aliphatic portion of the at least one polymer is within 10° C. of the $T_g$(mixture) that the Fox equation would predict.

In some embodiments, the at least one polymer includes a portion comprising aliphatic groups, and wherein at least a second portion of the at least one PECPS is compatible, wherein compatibility between the portion comprising aliphatic groups of the at least one polymer and the second portion of PECPS is defined by blends of the second portion of PECPS and the at least one polymer at a range of ratios (1:49 to 49:1, preferably 1:4 to 4:1 PECPS:polymer) exhibiting glass transition temperatures that are each within 25° C. of the Tg predicted by the Fox equation given below:

$$\frac{1}{Tg_{mixture}} = \frac{\omega_{PECPS}}{Tg_{PECPS}} + \frac{\omega_{polymer\ or\ polymer\ segment}}{Tg_{polymer\ or\ polymer\ segment}}$$

wherein Tg refers to the glass transition temperature in Kelvin for the PECPS and polymer or polymer segment and ω refers to the mass ratio of the PECPS and polymer or polymer segment of block copolymer where the mass ratio values, ω, are calculated using the sum of mass of the PECPS and polymer or, in the case of block copolymers, the amount of polymer segment present. The adhesive composition of the present invention may be used as a general purpose hot melt adhesive in a number of applications such as, for example, in disposable nonwoven hygienic articles, paper converting, flexible packaging, wood working, carton and case sealing, labeling and other assembly applications. Particularly preferred applications include nonwoven disposable diaper and feminine sanitary napkin construction, diaper and adult incontinent brief elastic attachment, diaper and napkin core stabilization, diaper backsheet lamination, industrial filter material conversion, surgical gown and surgical drape assembly, etc.

More stable HMAs exhibit less macroscopic phase separation upon standing long periods in the molten state. More stable HMAs also better maintain their physical properties over time and exhibit less of a shift in bond strength over time. HMAs with an increased rate of property development more rapidly reach final mechanical properties (stress-strain behavior) such that upon cooling, they require less time to anneal or cure to reach the ultimate physical properties of the HMA.

EXAMPLES

Materials and Methods

With the exception of the commercially produced styrene block copolymer, mineral oil, and commercially available styrene oligomers, all of the materials mentioned herein were purchased from Sigma Aldrich, and were used as received unless otherwise noted. Styrene came inhibited by butylcatechol. Tiapol 4202 is a styrene-butadiene-styrene block copolymer with a bound styrene percent of 38.5 to 41.5%, less than 1% diblock, and an melt flow of 7 g/10 min (190° C., 5 kg) was used as received from Dexco. Kaydol white mineral mineral oil was obtained from Sonneborn. The commercial pure monomer resins used in this work were purchased from Yashuhara (SX 100) and Ruetgers (N-Pure 70S and N-Pure 90S). The molecular weights of these materials were gathered using the methods described herein, and are displayed below.

| Material | Mn | Mw | Đ | Tg (C.) |
|---|---|---|---|---|
| N-Pure 70S | 603 | 2200 | 3.65 | 30.9 |
| N-Pure 90S | 774 | 3410 | 4.41 | 43.1 |
| SX 100 | 1130 | 2150 | 1.90 | 62.7 |

Lauroyl Terminated Styrene Oligomer

Synthesis of Lauroyl terminated precisely end-capped styrene oligomers (as well as phenyl terminated styrene oligomers) was achieved using a modified version of previously established methods from technical literature. 7.5 mL of styrene was passed over basic alumina then charged into a 200 mL round bottom reaction vessel. The styrene was diluted by an equal volume of toluene and lauroyl peroxide (4.5 grams) was then added to the reaction vessel. The contents of the vessel were agitated until the peroxide initiator appeared to be fully dissolved. The solution was next sparged with nitrogen for a period of 1 hour. The reaction mixture was then heated to 80° C. The vessel and contents were held at temperature while being agitated by a Teflon coated magnetic stir bar for 2 hours. Subsequently, the styrene oligomer was precipitated using 1 L of methanol. The resulting precipitate was then washed using with a solution of equal parts isopropanol and hexanes. The oligomeric material was then dried within a pressure reduced environment overnight.

Phenyl Terminated Styrene Oligomer 7.5 ml of styrene was passed over basic alumina before being charged into a 200 mL round bottom reaction vessel, and diluted by an equal volume of toluene. Benzoyl peroxide (1.4 grams) was then added to the reaction vessel. The contents of the vessel were agitated until the peroxide initiator fully dissolved. Degasification occurred via inert gas substitution (using nitrogen) for 1 hour. The reaction mixture was then heated to 90° C. The reaction was held at temperature while being agitated by a Teflon coated magnetic stir bar for 2 hours. Subsequently, the styrene oligomer (~4 kDa) was precipitated using 1 L of methanol. The resulting precipitate was then dissolved in toluene before being once again precipitated in 1 L of methanol. The oligomeric material was then dried within a pressure reduced environment overnight.

Styrene Oligomer Characterization Techniques

Molecular weight values were determined using gel permeation chromatography (GPC). The elution time of the samples mentioned in this work were compared to a series of polystyrene standards in tetrahydrofuran (THF). Differential scanning calorimetry (DSC) data were gathered under a helium environment using a heat, quench-cool, heat program. Heating occurred at a rate of 20° C./minute. GPC data for these materials are provided below.

| Material | Mn | Mw | Đ | Tg (C.) |
|---|---|---|---|---|
| BPO-Capped Oligomer | 3177 | 5535 | 1.74 | 72.4 |
| LPO-Capped Oligomer | 3506 | 4971 | 1.42 | 57.3 |

Additionally, the viscosity of oligomers mentioned in this document were evaluated using a Brookfield CAP 2000+ viscometer. The Viscosity of these materials, compared to commercially available oligomers are shown below.

| Temperature (C.) | Viscosity (cP) | | | | |
|---|---|---|---|---|---|
| | LPO Oligomer | BPO Oligomer | N-Pure 70S | N-Pure 90S | SX100 |
| 176.7 | 198 | 601 | 77.5 | 196.5 | 346.1 |
| 162.8 | 332 | 1630 | 135 | 381.3 | 816 |
| 148.9 | 682 | 5470.6 | 271 | 878 | 2332 |
| 135.0 | 1632 | 23760 | 656 | 2534 | 9210 |
| 121.1 | 4854 | — | 1883 | 9856 | 36036 |

In addition to differences in the temperature-dependent viscosities of the LPO and BPO containing materials, a substantial shift in solubility was also demonstrated. Notably, the LPO containing oligomer demonstrated substantially higher solubility in hexanes than its BPO terminated counterpart (which remained sparingly soluble in hexanes).

Methods for Adhesive Production and Evaluation

Both the lauroyl and phenyl terminated oligomeric materials as well as commercial pure monomer resins were solution blended in toluene with Taipol 4202 (with a 3 to 1 oligomer to polymer ratio) such that the solution contained 50% solids. 20 mL vials containing these solutions were agitated in an orbital shaker at 300 rpm until the solids were fully dissolved (approximately 4 hours).

Shear samples were prepared by blade-coating the toluene solutions on to a 0.002 inch polyethylene terephthalate film with a wet gate height of 250 microns. Residual solvent was removed by evaporation under ambient conditions for 2 hours, followed by heating within a reduced atmosphere environment (vacuum oven). Subsequently, the adhesive coated substrate was cut into 1×3 inch strips. A metal plate was first cleaned with isopropanol and methyl ethyl ketone, before being heated to a temperature of 177° C. The adhesive side of the coated substrate strip was placed over the hot metal plate with a 1 inch overlap. Uniform force was applied to plate and substrate by passing an roller over the sample a total of 3 times before allowing the sample to cool. A metal clip was used to attach a 1 kg weight to the bottom of each of the adhesive strips. The shear performance was evaluated both within a constant environment of 22° C. with a relative humidity of 50%, where all of the adhesives evaluated did not fail after 7 days. Additionally, shear was evaluated within a dynamic heating environment where temperature was gradually increased at a rate of 3° C. per minute, in order to determine the Shear Adhesion Failure Temperature (SAFT). This test was run twice while varying the position of the material within the heating environment (oven). The performance of the precisely end-capped oligomers is compared to formulations made using commercially available materials, as can be seen in table. Despite having very similar peak and average molecular weights, the BPO terminated oligomer formulation displayed a substantially elevated SAFT value. Conversely, the LPO-terminated oligomer sample displayed low SAFT values compared to even lower molecular weight commercial materials. Without being bound to theory, it is proposed that surprising results seen in the thermal behavior of the inventive materials are largely based on the chemical nature of the end-caps; in particular, the ability of the end-caps to influence both the thermal nature of the oligomer as well as the phase selectivity with the polystyrene and polybutadiene phases of the SBS block copolymer employed in the formulation

|  | Ave. Failure T(° C.) | Std Dev |
| --- | --- | --- |
| N-Pure 70S | 197 | 5.66 |
| N-Pure 90S | 217 | 11.31 |
| SX 100 | 226 | 8.49 |
| LPO Oligomer | 203 | 3.54 |
| BPO Oligomer | 250 | 7.78 |

When the word "about" is used in this specification in connection with a numerical value, it is intended that the associated numerical value include a tolerance of ±10% around the stated numerical value. Moreover, when reference is made to percentages in this specification, it is intended that those percentages are based on weight, i.e., weight percentages.

The molecular weights referred to in this specification are weight-average molecular weights (Mw) and determined by gel permeation chromatagraphy (GPC).

It is expressly intended that all such modifications, variations, substitutions, and equivalents which fall within the spirit and scope of the invention as defined by the appended claims shall be embraced by the appended claims.

What is claimed is:

1. A hot melt adhesive composition comprising:
a) about 2% to about 98% by weight of at least one polymer selected from the group consisting of polystyrene, polybutene, polyisobutene, linear low density polyethylene, polypropylene random copolymer, polypropylene, olefin block copolymer, polyolefins, styrene block copolymers, and ethyl vinyl acetate polymers;
b) 0% to about 80% by weight of a tackifying resin; and
c) about 2% to about 98% by weight of at least one precisely end-capped polystyrene (PECPS) having a formula of:

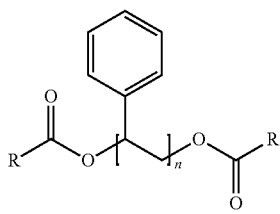

produced by the reaction below

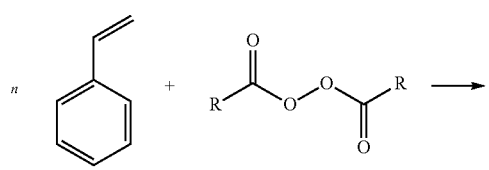

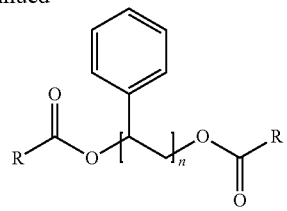

wherein n is from 2 to 20, and R is selected from the group consisting of:

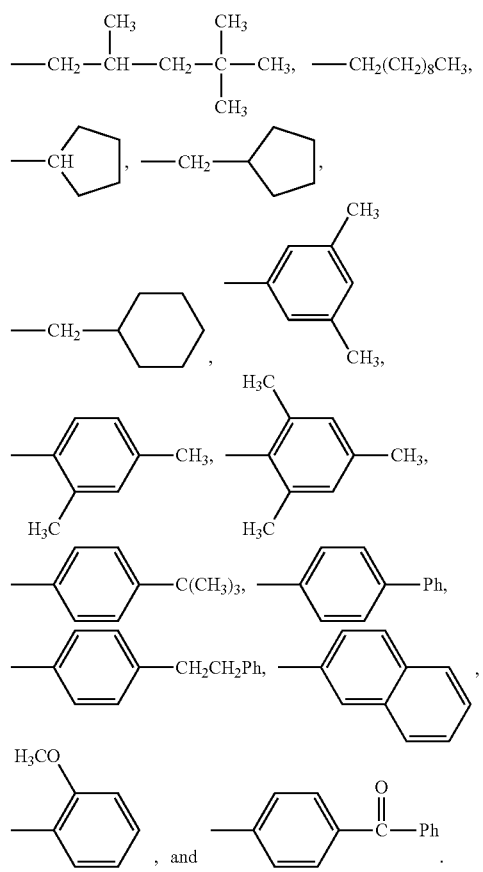

2. The hot melt adhesive composition of claim 1, wherein the at least one polymer includes a portion comprising aromatic groups, and wherein at least a first portion of the at least one PECPS is compatible with the portion comprising aromatic groups of the at least one polymer, wherein compatibility between the portion comprising aromatic groups of the at least one polymer and the first portion of PECPS is defined by blends of the first portion of PECPS and the at least one polymer at a range of ratios of 1:49 to 49:1 exhibiting glass transition temperatures that are each within 25° C. of the Tg of the mixture predicted by the Fox equation given below:

$$\frac{1}{Tg_{mixture}} = \frac{\omega_{PECPS}}{Tg_{PECPS}} + \frac{\omega_{polymer\ or\ polymer\ segment}}{Tg_{polymer\ or\ polymer\ segment}}$$

wherein Tg refers to the glass transition temperature in Kelvin for the PECPS and polymer or polymer segment and ω refers to the mass ratio of the PECPS and polymer or polymer segment of block copolymer where the mass ratio values, ω, are calculated using the sum of mass of the PECPS and polymer or, in the case of block copolymers, the amount of polymer segment present.

3. The hot melt adhesive composition of claim 1, wherein the at least one polymer comprises an end-block, and wherein at least a first portion of the at least one PECPS is compatible with the end-block of the at least one polymer, wherein compatibility between the end-block of the at least one polymer and the first portion of PECPS is defined by blends of the first portion of PECPS and the at least one polymer at a range of ratios of 1:49 to 49:1 exhibiting glass transition temperatures that are each within 25° C. of the Tg predicted by the Fox equation given below:

$$\frac{1}{Tg_{mixture}} = \frac{\omega_{PECPS}}{Tg_{PECPS}} + \frac{\omega_{polymer\ or\ polymer\ segment}}{Tg_{polymer\ or\ polymer\ segment}}$$

wherein Tg refers to the glass transition temperature in Kelvin for the PECPS and polymer or polymer segment and ω refers to the mass ratio of the PECPS and polymer or polymer segment of block copolymer where the mass ratio values, ω, are calculated using the sum of mass of the PECPS and polymer or, in the case of block copolymers, the amount of polymer segment present.

4. The hot melt adhesive composition of claim 2, comprising about 10% to about 50% of the at least one polymer, about 20% to about 80% of the tackifying resin, and about 2% to about 20% of the at least one PECPS.

5. The hot melt adhesive composition of claim 1, comprising about 2% to about 5% by weight of the at least one PECPS.

6. The hot melt adhesive composition of claim 1, further comprising a plasticizer.

7. The hot melt adhesive composition of claim 1, wherein the at least one polymer includes a portion comprising aliphatic groups, and wherein at least a second portion of the at least one PECPS is compatible with the portion of the at least one polymer comprising aliphatic groups, wherein compatibility between the portion comprising aliphatic groups of the at least one polymer and the second portion of PECPS is defined by blends of the second portion of PECPS and the at least one polymer at a range of ratios of 1:49 to 49:1 exhibiting glass transition temperatures that are each within 25° C. of the Tg predicted by the Fox equation given below:

$$\frac{1}{Tg_{mixture}} = \frac{\omega_{PECPS}}{Tg_{PECPS}} + \frac{\omega_{polymer\ or\ polymer\ segment}}{Tg_{polymer\ or\ polymer\ segment}}$$

wherein Tg refers to the glass transition temperature in Kelvin for the PECPS and polymer or polymer segment and ω refers to the mass ratio of the PECPS and polymer or polymer segment of block copolymer where the mass ratio values, ω, are calculated using the sum of mass of the PECPS and polymer or, in the case of block copolymers, the amount of polymer segment present.

8. The hot melt adhesive composition of claim 1, comprising about 20% to about 80% of the at least one polymer and about 20% to about 80% of the at least one PECPS.

9. The hot melt adhesive composition of claim 7, comprising about 20% to about 80% of the at least one polymer and about 20% to about 80% of the at least one PECPS.

10. The hot melt adhesive composition of claim 1, wherein the at least one polymer includes a portion comprising aromatic groups, wherein the hot melt adhesive comprises about 2% to about 20% of a first portion of PECPS compatible with the portion of the polymer comprising aromatic groups, wherein the at least one polymer includes a portion comprising aliphatic groups, wherein the hot melt adhesive comprises about 20% to about 78% of a second portion of PECPS compatible with the portion of the polymer comprising aliphatic groups, wherein compatibility between the portion comprising aromatic groups of the at least one polymer and the first portion of PECPS is defined by blends of the first portion of PECPS and the at least one polymer at a range of ratios of 1:49 to 49:1 exhibiting glass transition temperatures that are each within 25° C. of the Tg predicted by the Fox equation given below:

$$\frac{1}{Tg_{mixture}} = \frac{\omega_{PECPS}}{Tg_{PECPS}} + \frac{\omega_{polymer\ or\ polymer\ segment}}{Tg_{polymer\ or\ polymer\ segment}}$$

wherein Tg refers to the glass transition temperature in Kelvin for the PECPS and polymer or polymer segment and ω refers to the mass ratio of the PECPS and polymer or polymer segment of block copolymer where the mass ratio values, ω, are calculated using the sum of mass of the PECPS and polymer or, in the case of block copolymers, the amount of polymer segment present, and wherein compatibility between the portion comprising aliphatic groups of the at least one polymer and the second portion of PECPS is defined by blends of the second portion of PECPS and the at least one polymer at a range of ratios of 1:49 to 49:1 exhibiting glass transition temperatures that are each within 25° C. of the Tg predicted by the Fox equation given below:

$$\frac{1}{Tg_{mixture}} = \frac{\omega_{PECPS}}{Tg_{PECPS}} + \frac{\omega_{polymer\ or\ polymer\ segment}}{Tg_{polymer\ or\ polymer\ segment}}$$

wherein Tg refers to the glass transition temperature in Kelvin for the PECPS and polymer or polymer segment and ω refers to the mass ratio of the PECPS and polymer or polymer segment of block copolymer where the mass ratio values, ω, are calculated using the sum of mass of the PECPS and polymer or, in the case of block copolymers, the amount of polymer segment present.

11. The hot melt adhesive composition of claim 1, wherein the viscosity of the composition is equal to or less than about 20,000 centipoise (cP) at 163° C. (325° F.).

* * * * *